US012763059B2

(12) United States Patent
Bornheimer et al.

(10) Patent No.: US 12,763,059 B2
(45) Date of Patent: Oct. 13, 2026

(54) ADAPTIVE SOUND GENERATION BASED UPON CURRENT SOUND ENVIRONMENT PROPERTIES, CURRENT DEVICE PROPERTIES, AND CURRENT MEDIA PROPERTIES

(71) Applicant: Samsung Electronics Co., Ltd., Suwon-si (KR)

(72) Inventors: Sean R. Bornheimer, Orinda, CA (US); Joseph J. Verbeke, San Francisco, CA (US); Jeewon Jung, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 18/673,975

(22) Filed: May 24, 2024

(65) Prior Publication Data

US 2025/0363972 A1 Nov. 27, 2025

(51) Int. Cl.

*G10K 11/175* (2006.01)
*G10K 11/178* (2006.01)
*H04S 7/00* (2006.01)

(52) U.S. Cl.

CPC .... *G10K 11/1752* (2020.05); *G10K 11/17827* (2018.01); *H04S 7/303* (2013.01)

(58) Field of Classification Search

CPC .......... G10K 11/1752; G10K 11/17827; H04S 7/303

See application file for complete search history.

(56) References Cited

U.S. PATENT DOCUMENTS

| | | | |
|---|---|---|---|
| 10,536,786 B1 | 1/2020 | Lyon et al. | |
| 10,834,516 B2 | 11/2020 | Lyren et al. | |
| 11,551,164 B2 | 1/2023 | KnicKrehm et al. | |
| 11,611,840 B2 | 3/2023 | Li et al. | |
| 2011/0063442 A1 | 3/2011 | Aarts et al. | |
| 2014/0313006 A1 | 10/2014 | Mason et al. | |
| 2015/0281829 A1* | 10/2015 | Gauger, Jr. ............ | H04K 3/825 381/71.6 |

(Continued)

FOREIGN PATENT DOCUMENTS

| | | | |
|---|---|---|---|
| KR | 10-1606431 | B1 | 3/2016 |
| WO | 2022026481 | A1 | 2/2022 |

OTHER PUBLICATIONS

International Search Report and Written Opinion of the International Searching Authority dated Feb. 18, 2025, in connection with International Application No. PCT/KR2024/009208, 9 pages.

*Primary Examiner* — Mark Fischer

(57) ABSTRACT

A method includes determining, by a processor of an electronic device, current sound environment properties of an environment external to a user, current device properties of a sound playback device, and current media properties of media that is played through the sound playback device. The method further includes generating, by the processor based on (a) the current sound environment properties, (b) the current device properties, and (c) the current media properties, an adaptive masking soundscape that, when combined with external sounds in the environment, renders the external sounds less perceptible to the user. In addition, the method includes playing the adaptive masking soundscape through the sound playback device.

20 Claims, 13 Drawing Sheets

(56) References Cited

U.S. PATENT DOCUMENTS

| | | | | |
|---|---|---|---|---|
| 2015/0348530 | A1 | 12/2015 | Findlay et al. | |
| 2018/0344968 | A1 | 12/2018 | Gordon et al. | |
| 2019/0200158 | A1 | 6/2019 | Verbeke et al. | |
| 2020/0186912 | A1 | 6/2020 | Essid et al. | |
| 2022/0139048 | A1 | 5/2022 | MacDermot | |
| 2023/0300532 | A1* | 9/2023 | Spittle | G06F 3/165 381/1 |
| 2024/0112661 | A1 | 4/2024 | Blewett et al. | |
| 2024/0420673 | A1* | 12/2024 | Chang | G06F 3/165 |
| 2025/0344009 | A1* | 11/2025 | Ayzenberg | H04R 1/1083 |

* cited by examiner

ADAPTIVE SOUND GENERATION BASED UPON CURRENT SOUND ENVIRONMENT PROPERTIES, CURRENT DEVICE PROPERTIES, AND CURRENT MEDIA PROPERTIES

TECHNICAL FIELD

This disclosure relates generally to sound masking systems. More specifically, this disclosure relates to a system that facilitates dynamic and adaptive sound generation based upon real-time understanding of environmental soundscapes and user context for noise masking, noise alteration, or virtual soundscapes purposes.

BACKGROUND

Noise is an increasing health and quality of life problem. Currently, over half of all people live in cities, and as the population grows the number of people living in noisy urban areas will only continue to increase, making up an ever-larger share of the population. The United Nations estimates that, by 2030, 60 percent of the world will live in cities, up from 54 percent in 2016. Excessive noise leads to increased stress hormones, blood pressure and susceptibility to other chronic illnesses. In 2011, scientists found that a 10-decibel increase in aircraft noise was associated with a 28 percent increase in anxiety medication use. It also creates a kind of relentless distractibility that keeps people from noticing their very lives and their internal needs and longings. It can easily disrupt the ability of people to stay focused and be productive.

Large segments of the population additionally have severe emotional and cognitive issues with noise. An estimated 22 million people suffer chronic high annoyance because of long-term exposure to environmental noise. Furthermore, 15-20% of the population is estimated to be neurodiverse, and many have an audio processing disorder. Neurodivergent people are frequently highly sensitive to noisy environments. Soundscape alteration is a broadly embraced approach to reducing the discomfort, anxiety and annoyance of environmental noise. Soundscape alteration ranges from the simple (e.g., playing nature sounds on speakers) to more sophisticated methods (e.g., advanced sound masking systems implemented via built-in audio systems in retail and office environments).

SUMMARY

This disclosure relates to systems and methods for dynamic and adaptive sound generation based upon real-time understanding of environment and user context for noise masking, noise alteration, or virtual soundscape generation.

In a first embodiment, a method comprises determining, by a processor of an electronic device, current sound environment properties of an environment external to a user, current device properties of a sound playback device, and current media properties of media that is played through the sound playback device. The method further comprises generating, by the processor based on (a) the current sound environment properties, (b) the current device properties, and (c) the current media properties, an adaptive masking soundscape that, when combined with external sounds in the environment, renders the external sounds less perceptible to the user. The method additionally comprises playing the adaptive masking soundscape through the sound playback device.

In a second embodiment, an electronic device comprises a processor that is configured to determine current sound environment properties of an environment external to a user, current device properties of a sound playback device, and current media properties of media that is played through the sound playback device. The processor is further configured to generate, based on (a) the current sound environment properties, (b) the current device properties, and (c) the current media properties, an adaptive masking soundscape that, when combined with external sounds in the environment, renders the external sounds less perceptible to the user. The adaptive masking soundscape is played through the sound playback device.

In a third embodiment, a non-transitory computer readable medium contains instructions that when executed cause at least one processor of an electronic device to determine current sound environment properties of an environment external to a user, current device properties of a sound playback device, and current media properties of media that is played through the sound playback device, and to generate, based on (a) the current sound environment properties, (b) the current device properties, and (c) the current media properties, an adaptive masking soundscape that, when combined with external sounds in the environment, renders the external sounds less perceptible to the user. The adaptive masking soundscape is played through the sound playback device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
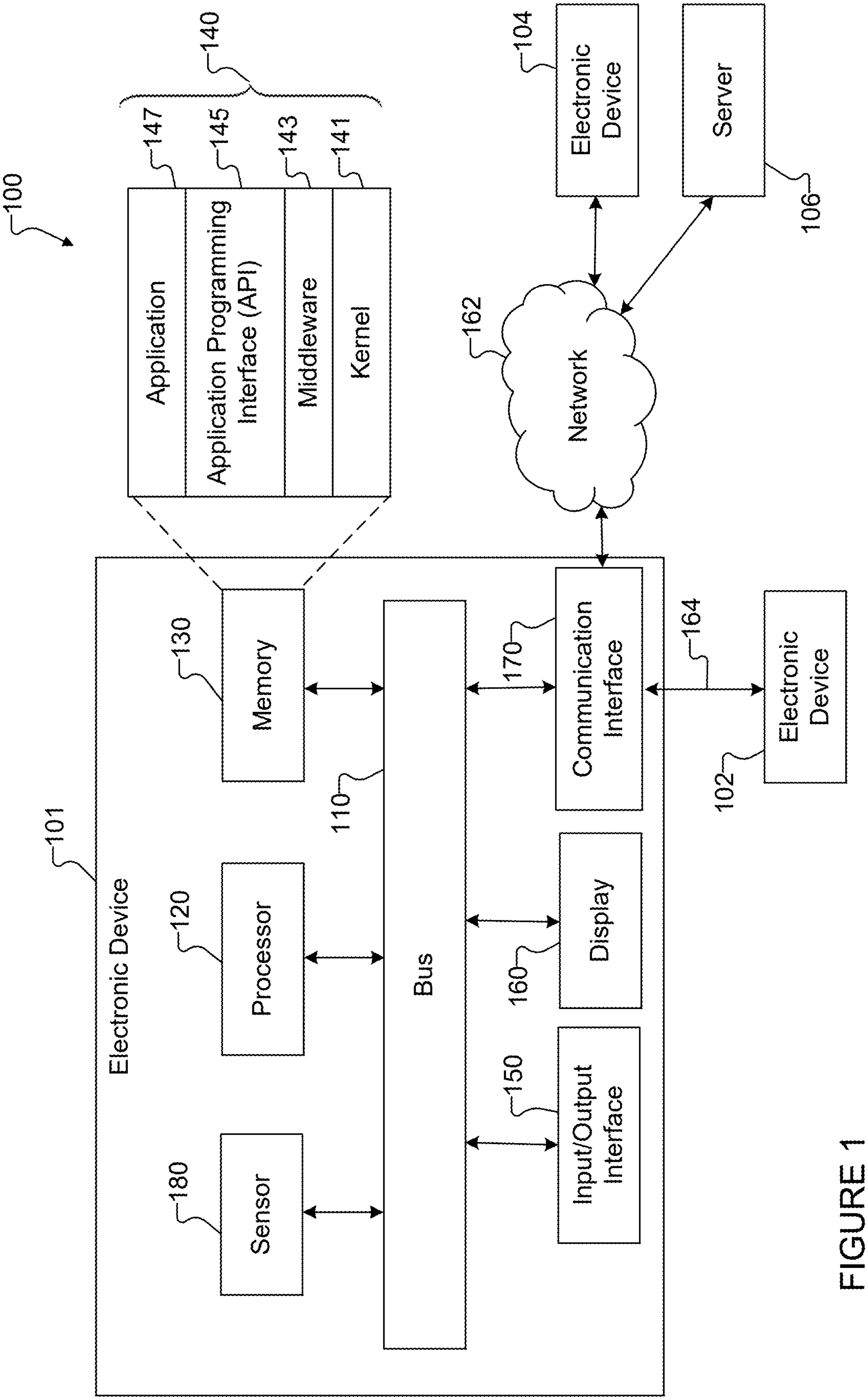
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, environmental noise is a public health and quality of life problem that is projected to become worse. Excessively noisy environments have been shown to have detrimental physical effects on people, and in our increasingly noisy world access to quiet spaces is becoming increasingly rare and valuable. The price people pay for silence has increased.

Our environmental soundscapes have a major impact on the potential for sensory overload, making it hard for people to focus and be productive. To deal with this challenge currently, people employ mitigation strategies such as turning up the volume on music to drown out the environment or using noise cancelling headphones. Alternatively, people may simply suffer through the discomfort and anxiety caused by environmental noise or avoid loud environments altogether.

The present disclosure recognizes that Active Noise Cancelling (ANC) headphones can help, but have limitations in blocking out mid- and high-frequency sounds. Above about 800 Hz, traditional ANC systems do not provide meaningful attenuation benefits. Beyond ANC, headphones may provide some limited passive sound isolation benefits due to physical occlusion of the ear canal. This may also be referred to as passive noise cancelling or passive noise reduction. However, many headphones or head mounted wearables (e.g., augmented reality glasses) are "open-type", meaning they do not occlude the ear canal and therefore cannot provide any meaningful noise reduction through either ANC or passive noise reduction via ear canal occlusion. At the same time, in lower frequency noise environments or lower dB environments ANC may effectively block out all environmental noise, leading to an uncomfortable or alarming "vacuum effect" where the wearer hears no sound whatsoever and feels a sensation of pressure.

The present disclosure further recognizes that sound masking, which can work independently or together with traditional audio system functions (such as ANC and passive noise cancelling, has well-established benefits, such as reducing the perceived noise level of an environment, reducing the intelligibility of voices in an environment, and improving how pleasant or comfortable one perceives an environment to be. However, existing sound masking approaches are not adaptive-they do not have the capability to consider the user's state or the user's particular environment to optimize the system dynamically and intelligently.

Accordingly, the present disclosure provides systems and devices that dynamically modify or adjust the soundscape experienced by a user to improve comfort, reduce distraction, and reduce cognitive load, thereby improving the user's experience in a noisy world. Embodiments of the present disclosure provide a system that uses real-time understanding of unwanted external sound events, noise diminishing capabilities of audio playback devices (e.g., headphones, head-mounted extended reality devices, speakers), and generation of adaptive masking soundscapes to render unwanted sound imperceptible through novel sound masking techniques.

For example, various embodiments of the present disclosure generate context-based matrix profiles from user environment data for use in baseline data management techniques for efficient, automatic, real-time detection of soundscapes in need of masking or enhancement. Using these context-based matrix profiles the system may determine if a user could benefit from adjustment or enhancement of the environmental soundscape based upon, e.g., the status of Active Noise Cancelling of the user's audio playback device (e.g., earbuds, headphones, speakers, etc.), the status and characteristics of media content playing through the audio playback device (e.g., loudness in dB across frequencies in Hz), the user's hearing profile, fitment of earbuds in the user's ear, and other factors that influence how much the real world soundscape around the user could impact a person. In generating the context-based matrix profiles the system may also detect the spectral characteristics of the soundscape of the user's external environment (e.g., loudness in dB across frequencies in Hz), and may classify sounds in the external environment that the user is in (e.g., "baby crying"). The system may also determine the acoustic scene of the external environment that the user is in (e.g., "noisy coffee shop") and how applicable sound generation is as a method to improve the user's experience of that environment.

Various embodiments of the present disclosure additionally provide a user- and priority-based pipeline for spatial sound generation confirmation and subsequent responsiveness determination to reduce unnecessary or inaccurate sound generation. Using these embodiments, the system may determine the spatial sound generation that would be most appropriate for the context—e.g., sound masking, sound enhancement, sound alteration—as well as which frequencies of sound to generate, at which volume, and where to reproduce the sounds spatially (if at all) relative to the user. The system may use, as inputs, the context-based matrix profiles discussed above. For example, the system may measure and determine in real time where sounds in the external soundscape are spatially located in relation to the head movement of the user. This spatial location may be determined in two dimensions (e.g., in terms of 360-degrees around the user) or in three dimensions (e.g., in terms of azimuth, elevation, and distance—referred to as "AED"—relative to the user). The system may prioritize and determine the appropriate response given these inputs.

Various embodiments of the present disclosure further provide an adaptive engine for generating digital spatial soundscapes that are dynamically, or adaptively, selected to alter the soundscape of the external environment around the user. For example, the system may assess the dynamically changing real-world sound environment around the user and determine artificial soundscapes that optimize noise masking, sound enhancement, or sound alteration for the dynamically changing sound environment. The system may adjust the artificial soundscape based on changes in the environmental soundscape, the user's head position (e.g., using head tracking), content played on the audio playback device, the spatial location of sounds, and fitment of headphones in the ear, among other factors. Based on the classification of the external environment (e.g., "noisy coffee shop") the system may match the same environment via spatial sound reproduction, but reduce its sensory overload (e.g., making the sounds of a busy coffee shop more peaceful) by transforming harsh, unpleasant, or repetitive sounds. In environments with relatively low frequency or relatively quiet noise (i.e., environments where ANC may remove substantially all noise), the system may play a simulated soundscape that emulates the natural sound environment to reduce the isolated or "vacuum" effect that can be felt from ANC usage. The system may also adaptively turn off high power usage ANC and replace it with spatial sound masking when appropriate to extend battery life with limited impact on user experience. These features contribute to the adaptive nature of the soundscape generated by the system, which is thus referred to as an adaptive masking soundscape. In some embodiments, the adaptive masking soundscape may be referred to as a dynamic spatial soundscape, referring to the spatial reproduction component of the system. It is understood, however, that a dynamic spatial soundscape is an adaptive masking soundscape.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to generation of dynamic and adaptive soundscapes for sound masking. For example, as described below, the processor 120 may determine current sound environment properties of an environment external to a user, current device properties of a sound playback device, and current media properties of media that is played through the sound playback device, and generate, based on (a) the current sound environment properties, (b) the current device properties, and (c) the current media properties, an adaptive masking soundscape that, when combined with external sounds in the environment, renders the external sounds less perceptible to the user. The processor 120 may also instruct other devices to perform certain operations (such as playing the adaptive masking soundscape using an audio output device like a speaker.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to generation of dynamic and adaptive soundscapes for sound masking. For example, the application 147 includes one or more applications supporting the receipt of audio from the environment external to the user. The Application 147 further includes one or more applications supporting analysis of the current sound environment properties of an environment external to a user, current device properties of a sound playback device, and current media properties of media that is played through the sound playback device. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device (such as headphones, earbuds, or HMD) or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
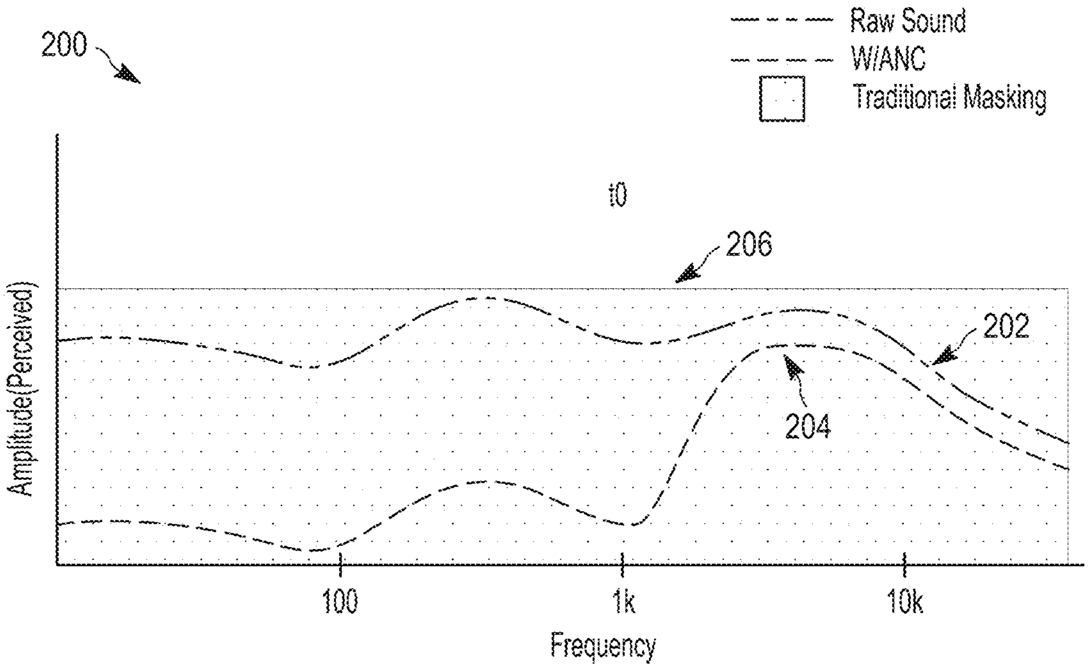
FIGS. 2A through 2D illustrate example graphs of perceived amplitude versus frequency of soundscapes and corresponding masking sounds in accordance with this disclosure.
Figure 2B:
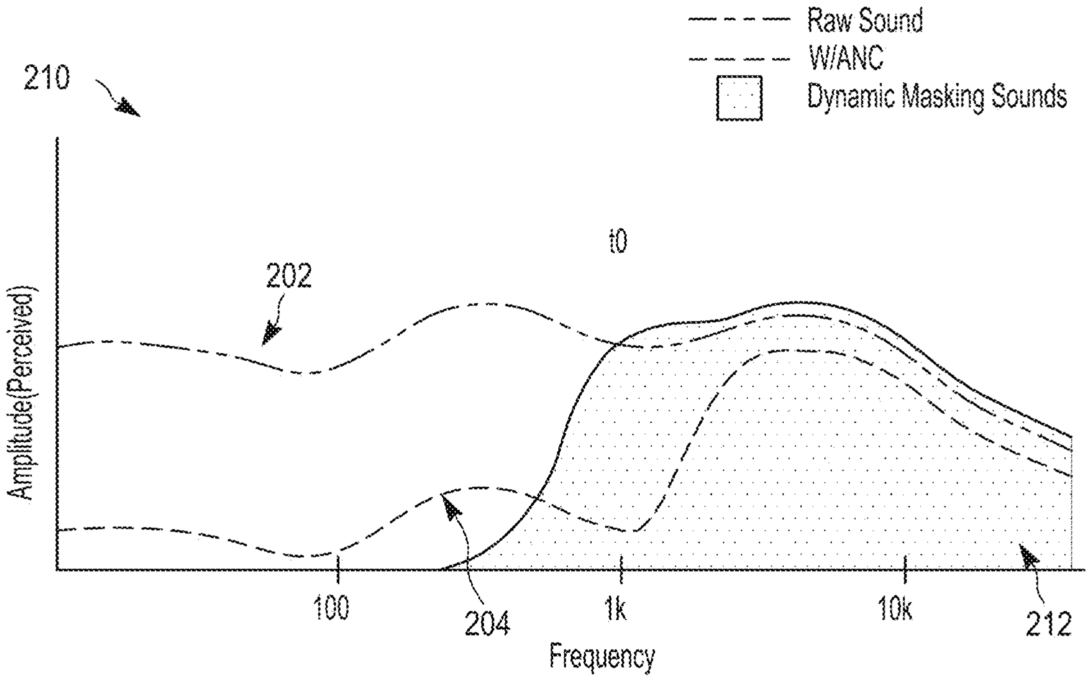
Figure 2C:
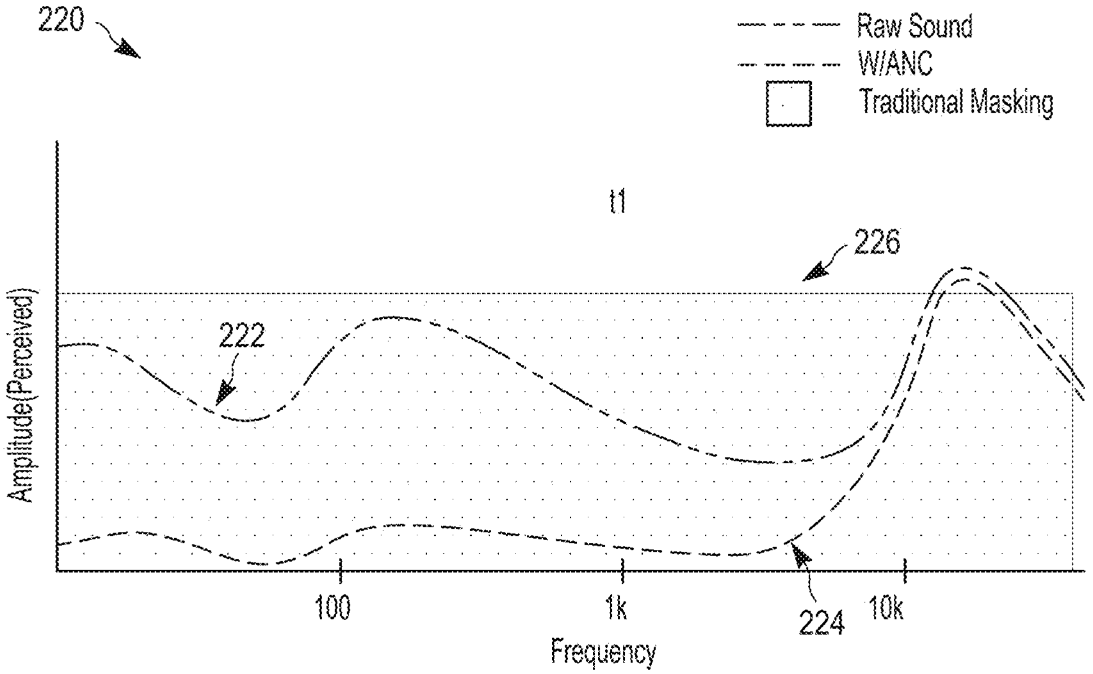
Figure 2D:
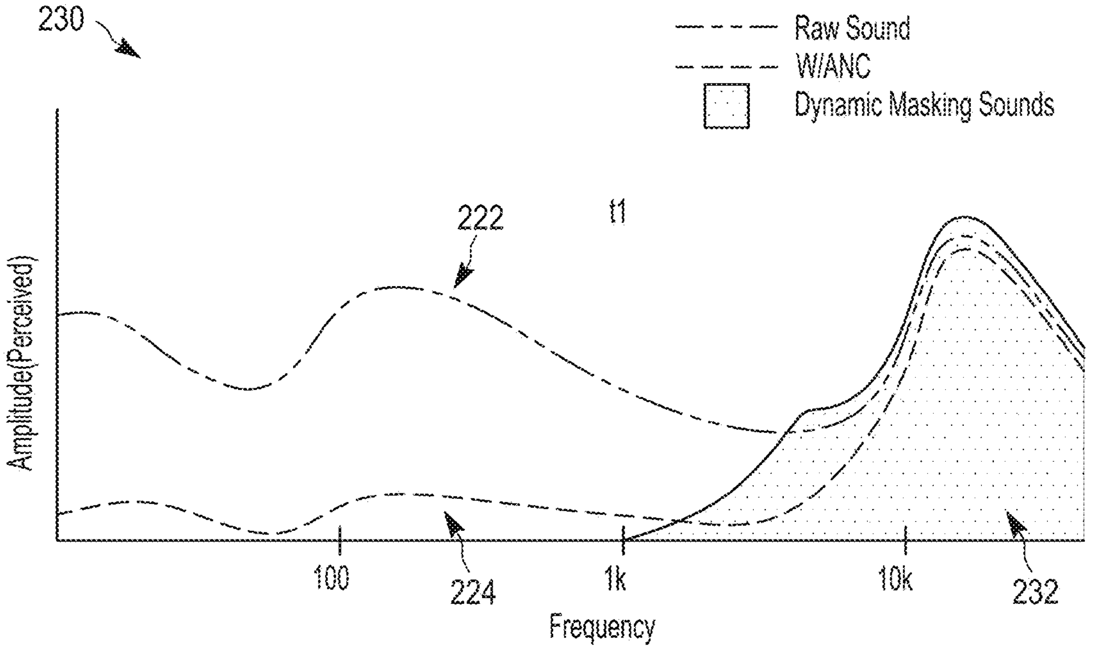

FIGS. 2A through 2D illustrate example graphs 200, 210, 220, and 230 of perceived amplitude versus frequency of soundscapes and corresponding masking sounds in accordance with this disclosure. In particular, FIGS. 2A and 2C illustrate example characteristics of traditional masking soundscapes, and FIGS. 2B and 2D illustrate example characteristics of dynamic masking soundscapes. For ease of explanation, the examples shown in FIGS. 2A through 2D are described with respect to a system implemented on or supported by the electronic devices 101 and 102 in the network configuration 100 of FIG. 1. However, the examples shown in FIGS. 2A through 2D could correspond to any other suitable device(s) and in any other suitable system(s).

As shown in graph 200 of FIG. 2A, a soundscape in an external environment around a user comprises raw sound with perceived amplitude and frequency characteristics 202 (as perceived by the user in the environment). In this example the user is wearing headphones or earbuds with ANC capabilities, and the soundscape as perceived by the user through ANC has the perceived amplitude and frequency characteristics 204. FIG. 2A additionally illustrates the perceived amplitude and frequency characteristics 206 of a traditional masking soundscape—e.g., white noise having substantially uniform perceived amplitude across all frequencies.

For the same external environment illustrated in graph 200 (having perceived amplitude and frequency characteristics 202), graph 210 of FIG. 2B illustrates perceived amplitude and frequency characteristics 212 for an example dynamic masking soundscape.

As shown in graph 220 of FIG. 2C, a different example soundscape in an external environment around the user (e.g., after the environment has changed) comprises raw sound with perceived amplitude and frequency characteristics 222. Graph 220 further illustrates the perceived amplitude and frequency characteristics 224 of the soundscape as perceived by the user through ANC, and the perceived amplitude and frequency characteristics 226 of a traditional masking soundscape, which is identical to the traditional masking soundscape of FIG. 2A.

For the same external environment illustrated in graph 220 (having perceived amplitude and frequency characteristics 222), graph 230 of FIG. 2D illustrates perceived amplitude and frequency characteristics 232 for a dynamic masking soundscape.

As illustrated in FIGS. 2A and 2C, traditional masking sounds (or soundscapes) are not dynamic in terms of amplitude or frequency composition. That is, traditional masking sounds do not consider the characteristics 202 or 222 of the external soundscapes or the characteristics 204 or 224 of the soundscapes perceived by the user after ANC is applied.

Meanwhile, as illustrated in FIGS. 2B and 2D, the dynamic masking sounds (or soundscapes) are dynamically adjusted in both amplitude and frequency components in response to the external soundscapes around the user. That is, the characteristics 212 and 232 of the dynamic masking soundscapes are designed to conform to the characteristics 202 and 222 of the external noise.

Although FIGS. 2A through 2D illustrate example characteristics of masking soundscapes, various changes may be made to FIGS. 2A through 2D. For example, it is understood that in practice dynamic masking sounds may not conform precisely to the shape of the external soundscape's frequency and amplitude characteristics, however, the masking sounds may be selected to have the closest conformity possible to the external noise. Furthermore, the system will be receiving real-time, constant analysis of the frequency and amplitude composition of the external soundscape to dynamically update both the type and loudness of masking sounds when appropriate. Furthermore, while frequency and amplitude of the soundscapes are illustrated for simplicity, it is also understood that other psycho-acoustic properties of the soundscapes (such as emotional valence) may be taken into consideration.

Figure 3:
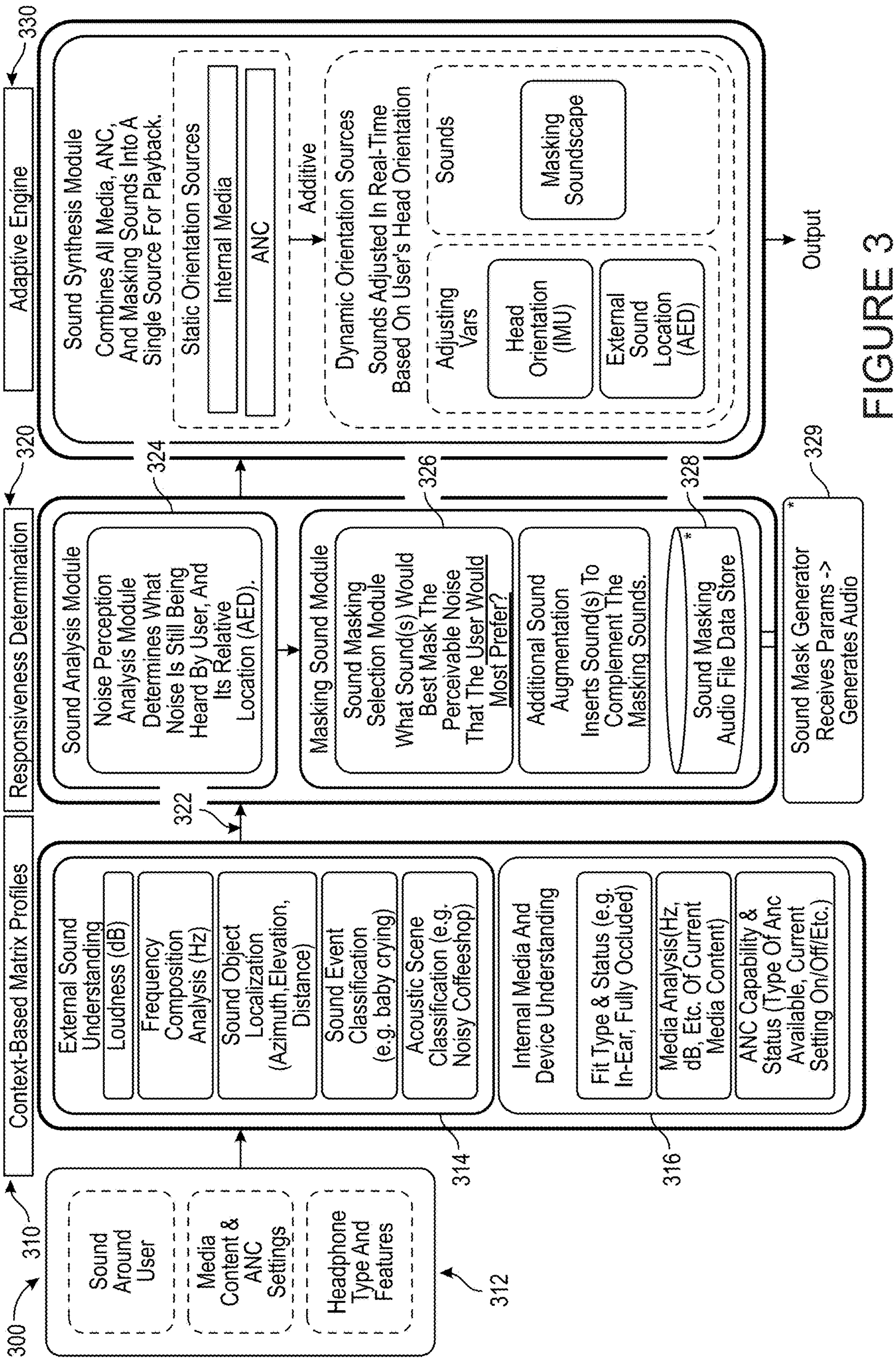
FIG. 3 illustrates an example synthetic noise cancelling system workflow in accordance with this disclosure.

FIG. 3 illustrates an example synthetic noise cancelling system workflow 300 in accordance with this disclosure. For ease of explanation, the workflow 300 shown in FIG. 3 is described as being implemented on or supported by the electronic devices 101 and 102 in the network configuration 100 of FIG. 1. For example, electronic device 101 may be a smart phone, personal computer, digital audio player, or the like, and electronic device 102 may be headphones, earbuds, or the like, such that the combination of electronic devices 101 and 102 comprises an audio playback system. One or both of electronic devices 101 and 102 may be considered an audio playback device. However, the workflow 300 shown in FIG. 3 could be used with any other suitable device(s) and in any other suitable system(s).

As shown in FIG. 3, the workflow 300 is comprised of three main components: the context-based matrix profile workflow 310, the responsiveness determination workflow 320, and the adaptive engine workflow 330. The context-based matrix profile workflow 310 is used to determine whether the user is in a situation that would benefit from spatial (e.g., 360-degree or AED) sound generation given information on the user's current context and the real-world soundscape. Primarily, this workflow seeks to determine whether there is external noise that ANC (if available) cannot cancel, and that media content is not already masking. Typically, an audio playback system employing sound masking requires a user to manually evaluate their perceived comfort level while using the system in a particular external environment and determine whether they need to use or apply sound masking or generation, and, if so, what level of sound masking or generation to apply. The system of the present disclosure, through the context-based matrix profile workflow 310, automatically evaluates the external real-world soundscape across a variety of factors and evaluates the user context and status across a variety of factors to assess sound masking or generation usefulness.

The context-based matrix profile workflow 310 takes inputs 312, which includes inputs from both the external sound environment and the audio playback system. Inputs 312 from the external environment may include measurements of the external soundscape around a user. Inputs 312 from the audio playback system may include settings and status of media applications, details of media content being played through the media applications, and status and features of headphones (or earbuds, speakers, etc.).

The context-based matrix profile workflow 310 may include an external sound understanding component 314 that analyzes the sound around the user as one determining factor for whether playback of additional sounds to the user would be beneficial to mask external sounds. The overall loudness (in dB) and frequency composition (in Hz) of the external soundscape may be analyzed, and the acoustic scene may be classified (e.g., "noisy coffee shop", "airport", "library", "public transportation", etc.). Additionally, individual sound events/objects in the scene may be classified (e.g., "baby crying", "airplane engine", "conversation", "car horn", etc.), and for each individual sound event/object its loudness, frequency composition, temporal properties (e.g., transient/random or non-transient/repetitive) and timbre/tone properties may be determined. Additionally, the spatial location of each sound event/object—in terms of, e.g., azimuth, elevation, and distance (AED)—relative to the position of the user may be determined, along with the spatial width or size of the sound event/object. This spatial location may be independent of the user's head rotation if the audio playback device is equipped with an inertial measurement unit (IMU) for rotation detection.

The context-based matrix profile workflow 310 may also include an internal media and device understanding component 316 that analyzes the current audio status of the system as another determining factor for whether playback of additional sounds to the user would be beneficial to mask the external sounds. This component may analyze the volume (in dB) and frequency composition (in Hz) of media content being played, if any, as well as the type of content being played (e.g., audio book, music, etc.). The internal media and device understanding component 316 may additionally determine the ANC capability and status of the device (e.g., what model of ANC system, Off/On/Level High or Low) and the passive sound isolation efficacy of the device (e.g., level of occlusion of the user's ear canals—as measured by earbud fit systems which generate this from infrared, or sound-based systems for ear fitment/occlusion detection—or level of passive isolation provided by on-ear or over-ear headphones). Based on the ANC and passive isolation determinations, the internal media and device understanding component 316 may determine a combined efficacy of the ANC and passive isolation for volume reduction (in dB) across the frequency spectrum (in Hz).

From the analysis results of the external sound understanding component 314 and the internal media and device understanding component 316, the context-based matrix profile workflow 310 may determine if the user would presently benefit from sound masking given the device status (e.g., if the ANC system is sufficient to block the external noise, or the media content is sufficient to mask the external noise. then no action is needed). If the system determines that the user would benefit from sound masking, then as shown in FIG. 3, the external sound understanding component 314 may provide the results of its analysis to the responsiveness determination workflow 320 as inputs 322.

The primary function of the responsiveness determination workflow 320 is to determine what sound or sounds would be most beneficial to the user in masking external sounds that are not already cancelled by ANC or masked by internal media content playback. The responsiveness determination workflow 320 may receive, as inputs 322, the analysis results from the context-based matrix profile workflow 310. In some embodiments, the responsiveness determination workflow 320 may be agnostic to the source of the inputs 322—that is, whether the inputs come from the context-based matrix profile workflow 310 or from a different source may be irrelevant to the responsiveness determination workflow 320.

A sound analysis module 324 of the responsiveness determination workflow 320 may be used to determine the properties of external noise that is still being heard by the user despite the isolation effects of ANC and passive isolation in the system and the masking effects of media content being played on the system. This remaining external noise may be comprised of individual sound objects that are identified by the sound analysis module 324. A unique benefit of this system is that it can provide the same core value—rendering external noise imperceptible through sound masking—to devices with ANC, in-ear devices without ANC (such as earbuds, which still offer some passive isolation), open-ear devices (which offer neither ANC nor passive isolation), and near-ear devices (such as AR or VR HMD speakers, which offer neither ANC nor passive isolation).

A masking sound module 326 of the responsiveness determination workflow 320 may then determine the properties of an appropriate soundscape that will mask the remaining external noise (i.e., cause the perceptible external noise to become imperceptible). This may include determining properties of a separate masking sound that is best suited to mask each individual sound object of the remaining external noise. In some embodiments, the masking sound module 326 may select these sounds from a data store or database 328 (which may be a non-volatile memory) that stores a number of pre-determined masking sounds.

The masking sound module 326 of the responsiveness determination workflow 320 may consider the qualitative desirability of the overall "composition" of the soundscape, e.g., the emotional valence of the soundscape, with the goal of providing an overall soundscape that will have a positive emotional valence and thus be pleasant for the user to listen to. White noise (or other forms of sculpted noise) is used by traditional sound masking approaches and are very efficient at masking sounds, but they are not pleasant sounds. For example, while white noise of sufficient volume would successfully mask most sounds (as shown in FIGS. 2A and 2C), this would likely be perceived with negative emotional valence by a user. Instead, for example, nature sounds with similar masking properties may be chosen, as nature sounds are typically perceived with positive emotional valence. In even further detail, a river sound may be selected to mask a fan located to the right of the user, and bird chirps may be selected to mask car horns honking to the left of the user.

Figure 4:
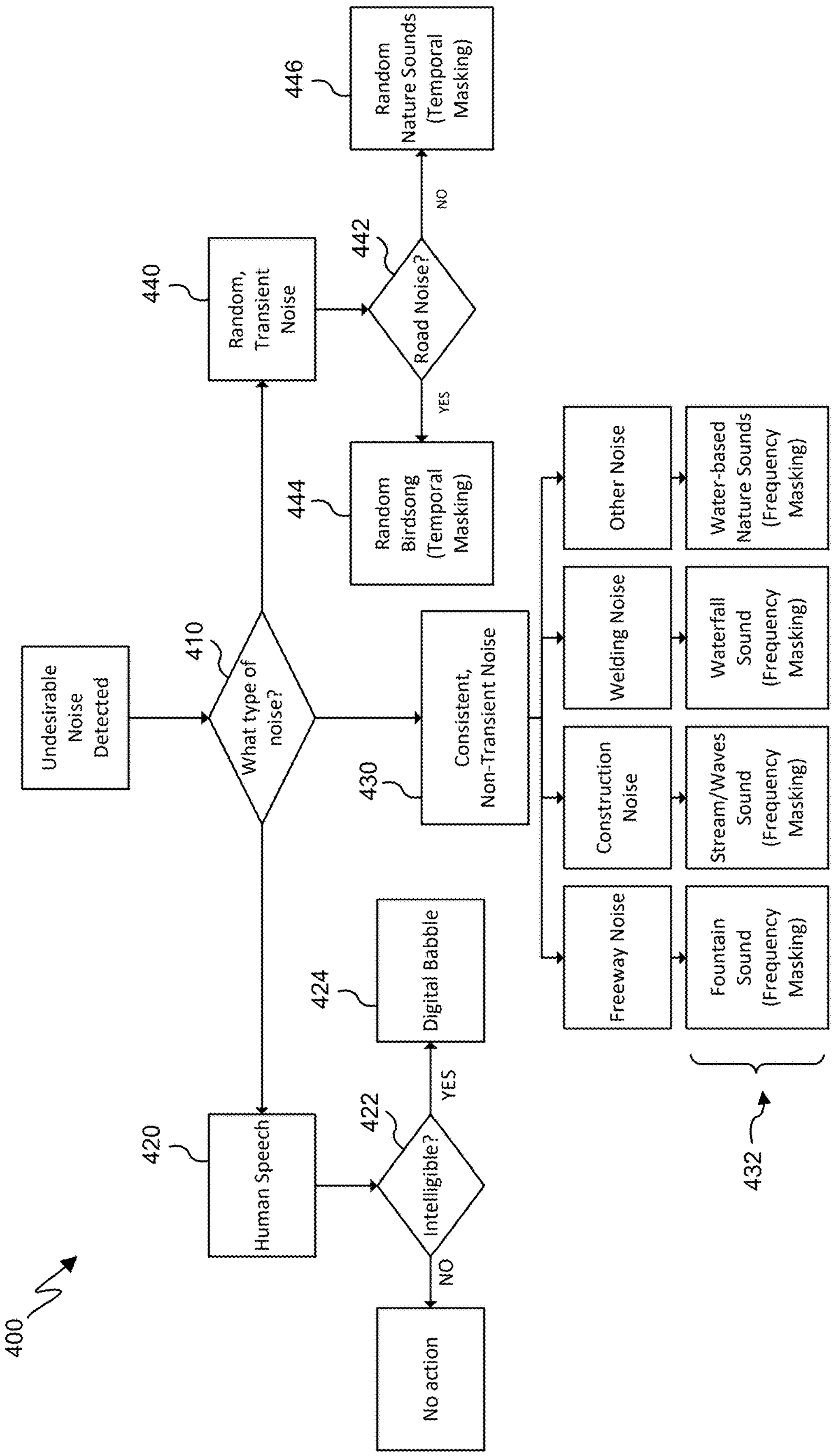
FIG. 4 illustrates an example flowchart of a generalized method of determining a masking sound selection for a given external noise stimulus in accordance with this disclosure.

FIG. 4 illustrates an example flowchart 400 of a generalized method of determining a masking sound selection for a given external noise stimulus in accordance with this disclosure. The flowchart 400 may represent a method used by the masking sound module 326 to determine which masking sound to select from the database 328. In this example, the database 328 may include a selection of sounds that are pre-determined to have positive emotional valence and to sufficiently mask a range of common noise sources. If all masking sounds in the database 328 are pleasant, then imperceptibility of external noise becomes the target metric for the masking sound module 326. The masking sounds used by the present system may use one or more of the following methods to render an external sound imperceptible: frequency masking, incomprehensibility, and temporal masking. Frequency masking is masking of noise with a consistent, non-transient sound containing similar frequency components at similar or higher amplitudes. Incomprehensibility applies to human voices, which are one of the main distracting sounds for users. Using this method, the masking sounds may not completely mask all frequencies of the voices around the user, but they nevertheless render the speech unintelligible (or incomprehensible) to the user and thus prevent the voices from increasing cognitive load on the user. Temporal masking applies to transient (e.g., short, irregular) sounds. Transient noise events may be rendered imperceptible by playing a transient masking sound with a similar frequency composition either immediately before the transient noise (referred to as forward masking) or immediately after the transient noise (referred to as backward masking).

As shown in FIG. 4, when undesirable noise is detected (e.g., the external noise that is still being heard by the user, as determined by the sound analysis module 324), the system may determine what type of undesirable noise is detected at block 410 (e.g., using the properties of the external noise determined by the sound analysis module 324, including the sound classification). If the noise is determined to be human speech (block 420), then the goal of the system is to reduce distraction by making the voices unintelligible without introducing noise that distracts the user in a new way. If the noise is determined to be consistent, non-transient noise (block 430), then the goal is to reduce the perceived noise level by introducing consistent noise that is more pleasant to hear at similar loudness and with similar frequency composition. If the noise is determined to be random, transient noise (block 440), then the goal is to render the random noise imperceptible by introducing random noise that is more pleasant to hear at similar loudness and with similar frequency composition.

With respect to human speech (block 420), the system may further determine whether the detected speech is intelligible at block 422. If the speech is determined to be unintelligible to begin with, then the goal of the system has already been achieved and no further action is necessary. However, if the speech is intelligible then at block 424 the system introduces digital babble. The premise for selecting digital babble as the optimal masking sound for rendering intelligible speech unintelligible is grounded in aspects of how human auditory and cognitive systems work. Namely, that intelligible human speech is uniquely distracting to other humans. This is broadly shown in foundational research, notably the irrelevant speech effect. Human brains are designed to process human speech, and therefore irrelevant speech can be undesirable and distracting. When a person hears intelligible voices, their brain involuntarily engages their attention-when the intelligible speech is unrelated to that person, this creates a distraction and impacts their ability to focus or relax. When human speech is unintelligible, however, the brain does not try to decipher it and the cacophony of speech essentially becomes a form of monotonous white noise that is not overly distracting. Therefore, the goal of the system is to make speech unintelligible to reduce distraction and improve relaxation. A good way to make intelligible speech unintelligible is to mask it with artificially created unintelligible speech ("digital babble"). This effectively turns off the brain's involuntary engagement of attention while creating a consistent speech-like sound environment that is more effective at masking the distraction aspects of intelligibility and sudden changes in speech noise. Furthermore, digital babble demonstrates positive effects on memory recall—it is as effective as a silent environment for memory recall.

Other masking sounds (e.g., pink noise, waves) may be used to make speech unintelligible, but they are less desirable because they introduce new potential sources of distraction (e.g., via artificial pink noises or wave sounds) that do not match the environment the person is in. Digital babble's similarity to human speech without being intelligible makes it uniquely suited for masking speech while minimizing cognitive distraction. Additionally, human speech can be considered a non-stationary sound—that is, it changes and falls within a range of 250 Hz to 4 kHz, as opposed to a stationary sound like the hum of a refrigerator. Accordingly, the effectiveness of a sound mask on speech depends on matching both the variations in speech sound and the spectral characteristics of speech, which a digital form of incomprehensible speech (digital babble) is well positioned to do. Other types of masking sounds (e.g., pink noise) are not as appropriate for matching the frequency range and variability inherent to human speech. Furthermore, while sound masking can reduce speech intelligibility, it is important to balance this with comfort and the potential for listener fatigue. Too much noise can be perceived as annoying or tiring, which is a further limitation of approaches like pink noise. The pleasantness of various sound masking effects for dealing with intelligible speech shows digital babble as most preferrable in this dimension.

With respect to consistent, non-transient noise (block 430), the system introduces consistent, non-transient nature sounds as masking sounds. The core premise for selecting consistent, non-transient nature sounds as the optimal masking sounds for rendering consistent, non-transient undesirable noises (e.g., freeway noise, construction noise, welding noise, etc.) imperceptible is grounded in the constant, stationary occurrence of these undesirable noises in the soundscape. This constant unpleasant noise is physically and emotionally taxing, resulting in increased stress and discomfort over extended periods. An analogy can be made to bright, consistent visual noise, e.g., car headlights—in a dark environment bright headlights are blinding, but the same headlights in a brighter environment are not as physically jarring. High contrast means high dynamic range. The same is true for sound, and by introducing a pleasant sound mask the present system reduces the dynamic range perceived by the user without creating an unpleasant environment.

In this example, various water sounds are selected to mask various types of non-transient noise (as shown in blocks 432). The frequency spectrum of water sounds is broad, which allows water sounds to effectively mask or blend with a variety of undesirable non-transient noises, including traffic or freeway noise. By adding a layer of sound that is more pleasant, the water sounds can make the unwanted noise less discernible. Furthermore, water sounds are well suited to create this effect because they can be designed to have a naturally consistent nature (e.g., a water fountain sound) which matches the consistent real-world noise in a way that is more pleasant and less distracting. In addition to the efficient masking properties and the perceived pleasantness (positive emotional valence) of these water noises, there is a proven cognitive and physiological benefit of selecting non-transient water-based nature sounds for masking of non-transient undesirable noise (e.g., traffic sounds). Research indicates that for construction noise, stream or wave sounds in particular are better than other water sounds (e.g., waterfall) and other nature sounds (e.g., insects), for welding noise water sounds are good but waterfall sounds in particular are best, and for freeway noise a fountain sound (i.e., a loud water sound) is best.

With respect to random, transient noise (block 440), the system introduces randomized, transient nature sounds as masking sounds. The core premise for selecting randomized, pleasant, transient nature sounds as the optimal masking sounds for rendering random, transient, undesirable noises imperceptible is grounded in the unpredictable, low-frequency occurrence of these noises, which are jarring and cause the user's attention to become diverted.

Figure 5:
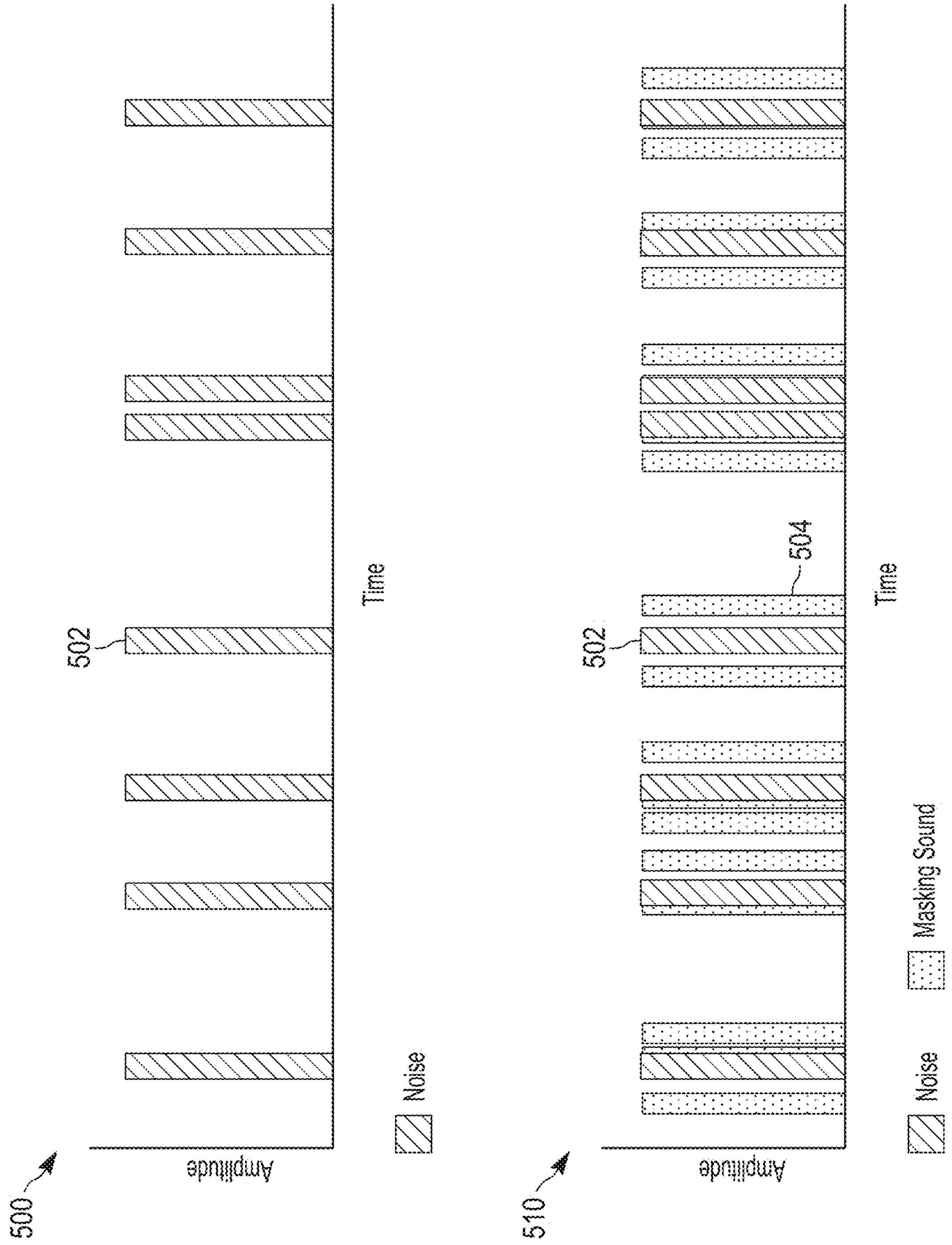
FIG. 5 illustrates an example graph of random transient undesirable noise and an example graph of randomized transient masking sounds played over the undesirable noise in accordance with this disclosure.

FIG. 5 illustrates an example graph 500 of random transient undesirable noise and an example graph 510 of randomized transient masking sounds played over the undesirable noise in accordance with this disclosure. Through the introduction of a high occurrence random repetition of a pleasant transient sound 504 with an appropriate frequency composition for masking, the undesirable noise 502 will become imperceptible to the user. This technique is more efficient than use of a non-transient or repetitive sound (e.g., white noise) due to the sudden transient nature of the undesirable noise. Additionally, a higher occurrence frequency or cadence of transient masking sounds is known to have an increased perceived pleasantness. For example, a bird chirping sound played 4-6 times within a 30 second period has been shown to be more pleasant and effective at masking transient road noise than the same bird chirping sound played 2 times within the 30 second period.

Returning to FIG. 4, the system differentiates between road noise and other random transient noises at block 442. For random road noise (consistent with a low traffic road), the system introduces birdsong sounds at block 444. For all other random transient noises, a suitable pleasant transient nature sound is chosen at block 446. Bird song and some other nature sounds (e.g., insect sounds) have a variety of characteristics that make them appropriate for masking unpleasant, random, transient noise. In particular, birdsong is complex and variable, with a wide range of frequencies (from less than 500 Hz to more than 8,000 Hz), pitches, and rhythms. This complexity can effectively mask transient noises by filling the auditory scene with pleasant sounds that distract the listener's attention away from the undesirable noise. The broad frequency range of bird song gives bird song a broad opportunity to mask environmental noise in a way that feels natural. The cadence or occurrence frequency of bird song and some other nature sounds is naturally random and can be adjusted or increased in a way that sounds natural and pleasant, which is important because changes in occurrence frequency can be effective in certain soundscapes. The unpredictable nature of birdsong also makes it unlikely that the brain will tune it out as background noise, maintaining its effectiveness as a masking sound. Additionally, birdsong (and other nature sounds, e.g., some insect sounds) is psychologically calming to humans, and is therefore pleasant.

Returning to FIG. 3, in an alternative embodiment, instead of selecting pre-existing sound files from a database 328, the system includes a data-to-audio sound mask generator 329 (e.g., a generative audio engine) that creates an appropriate masking sound in real time based on data that is output from the sound masking selection module 326. For example, when the sound masking selection module 326 determines the properties of an appropriate soundscape to mask the remaining external noise, it converts those properties into an appropriate format output to be used by the sound mask generator 329 (e.g., a textual description, CSV file, JSON file, etc.). The sound mask generator 329 may be, for example, a text-to-audio generative artificial intelligence (AI) model that is trained to generate audio files that function as masking sounds—with positive emotional valence—for sounds having the input properties. The sound mask generator 329 in this case may use any combination of diffusion architecture and methods, transformer architecture methods, or the like, to generate the audio file.

Once masking sounds have been selected (or generated) by the responsiveness determination workflow 320, the masking sounds may be passed to the adaptive engine workflow 330. The core functionality of this workflow is determining how to deliver the final aggregate of sound to the user, including internal media, ANC (if applicable to the audio playback device hardware), and the dynamic masking soundscape. These separate sound sources are summed together for final playback through the audio playback device. For devices with an integrated IMU, the user's head orientation may be used to adjust the spatial orientation of the sounds in the dynamic masking soundscape, making it a dynamic spatial soundscape. For devices without an integrated IMU, and therefore unable to render sound with spatial placement dependent on the user's head orientation, the final decoded format for playback will be stereo (non-spatial), which will still provide sound masking.

If available, spatial placement of the sounds in the soundscape is beneficial as it does not overwhelm the user's senses or the digital content that is currently being played on the head mounted wearable, by only masking sound in the spatial sound field where it is required. Using external speech as an example of undesirable noise, the sound masking content (e.g., digital babble) may be played in the same spatial direction as the external real world conversation, and as the user turns their head the sound masking field adjusts to enhance the ability to make the sound mask believable and the real world conversation unintelligible.

The adaptive engine workflow 330 may also be used for systems that are not mounted on the user at all (e.g., speaker systems). As the core premise of the system is rendering noise imperceptible via dynamic adjustment of masking sounds using a real-time understanding of external noise, the final playback of sound could be decoded/rendered to a non-head-worn speaker system surrounding the user.

Although FIG. 3 illustrates one example of a synthetic noise cancelling system workflow 300, various changes may be made to FIG. 3. For example, various components and functions in FIG. 3 may be combined, further subdivided, replicated, or rearranged according to particular needs. Also, one or more additional components and functions may be included if needed or desired.

Although FIG. 4 illustrates an example flowchart 400 of a generalized method of determining a masking sound selection for a given external noise stimulus, various changes may be made to FIG. 4. For example, while shown as a series of steps, various steps in FIG. 4 could overlap, occur in parallel, occur in a different order, or occur any number of times (including zero times).

Figure 6:
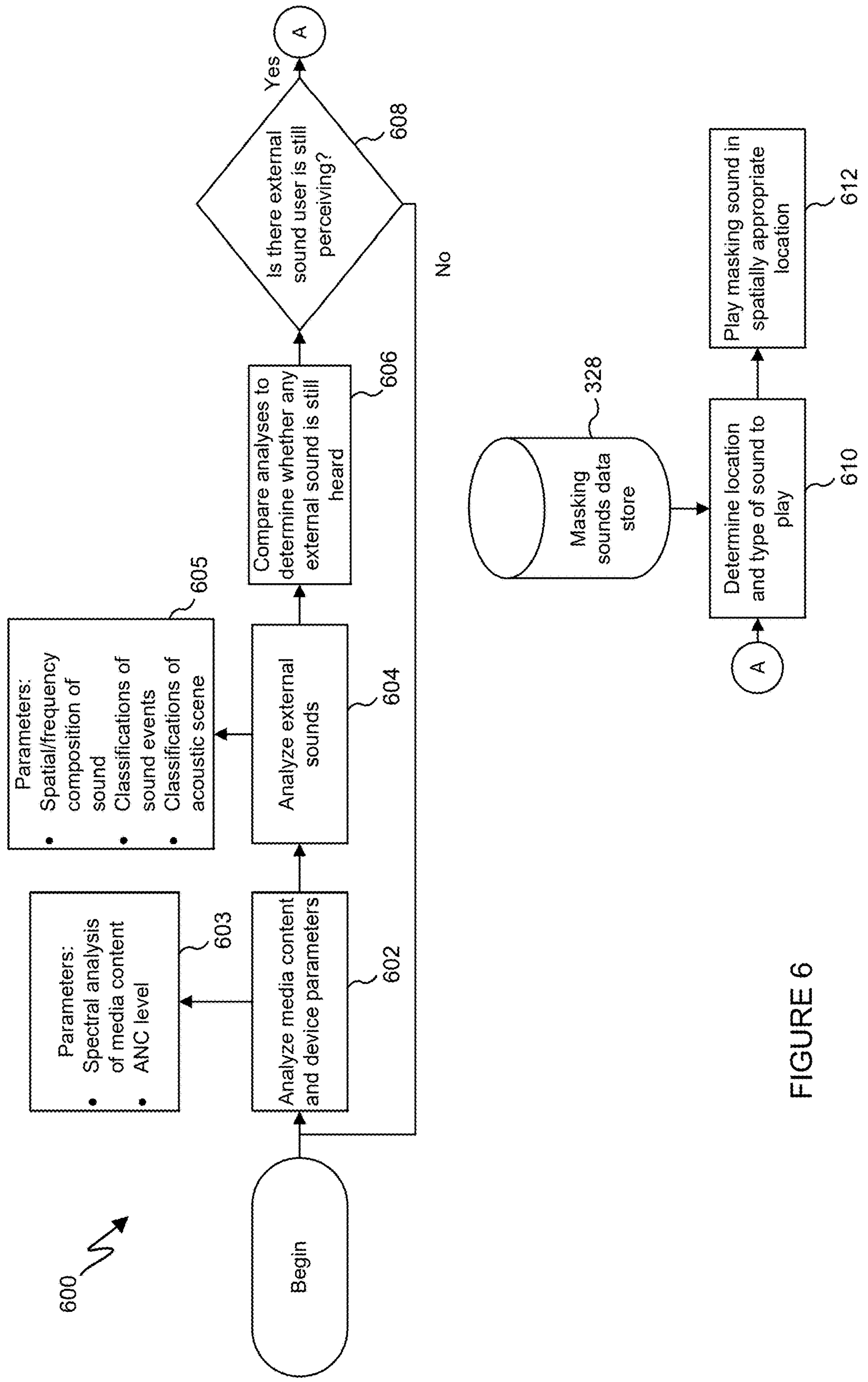
FIG. 6 illustrates an example synthetic noise cancelling process in accordance with this disclosure.

FIG. 6 illustrates an example synthetic noise cancelling process 600 in accordance with this disclosure. For ease of explanation, the process 600 shown in FIG. 6 is described as being implemented on or supported by the electronic devices 101 and 102 in the network configuration 100 of FIG. 1. The process 600 shown in FIG. 6 is an example of a process that may be performed by the synthetic noise cancelling system workflow 300 of FIG. 3.

As shown in FIG. 6, the process 600 includes analyzing media content and device parameters (i.e., parameters internal to the system) at step 602, analyzing external sounds at step 604, comparing the results 603 and 605, respectively, of these analyses at step 606, and determining at step 608 whether the user is able to perceive any external sound—that is, whether audio playback device features (ANC, passive isolation, etc.) are removing the external noise or media content features (loudness, frequency composition, etc.) are already masking the external noise. Steps 602-608 may be performed by the context-based matrix profile workflow 310. For example, step 602 may correspond to the external sound understanding component 314 and step 604 may correspond to the device understanding component 316 of the context-based matrix profile workflow 310.

If at step 608 the process determines that the user cannot perceive any external noise, then the system need not take any further action. The system returns to step 602 and continuously monitors the internal system and external noise parameters to determine when the system does need to take further action.

If at step 608 the process determines that the user can still perceive some undesirable external noise, then at step 610 the process determines an appropriate masking sound (or sounds) for the undesirable noise that the user can still perceive. In this example, the masking sounds are selected from a database 328. In other embodiments, a sound mask generator 329 may be used to generate the masking sounds. and a spatial location at which to play them. Step 608 may be performed by the responsiveness determination workflow 320.

At step 612 the process plays the selected (or generated) masking sounds. For example, the process may synthesize multiple masking sounds into a dynamic masking soundscape and play it through the audio playback device of the system. In this example, the process also involves determining the appropriate spatial location of each masking sound, resulting in a dynamic spatial soundscape. Step 612 may be performed by the adaptive engine workflow 330.

Although FIG. 6 illustrates one example of a synthetic noise cancelling process 600, various changes may be made to FIG. 6. For example, while shown as a series of steps, various steps in FIG. 6 could overlap, occur in parallel, occur in a different order, or occur any number of times (including zero times). Additionally, certain steps may be modified—for example, step 612 may be performed without any spatial component.

Figure 7:
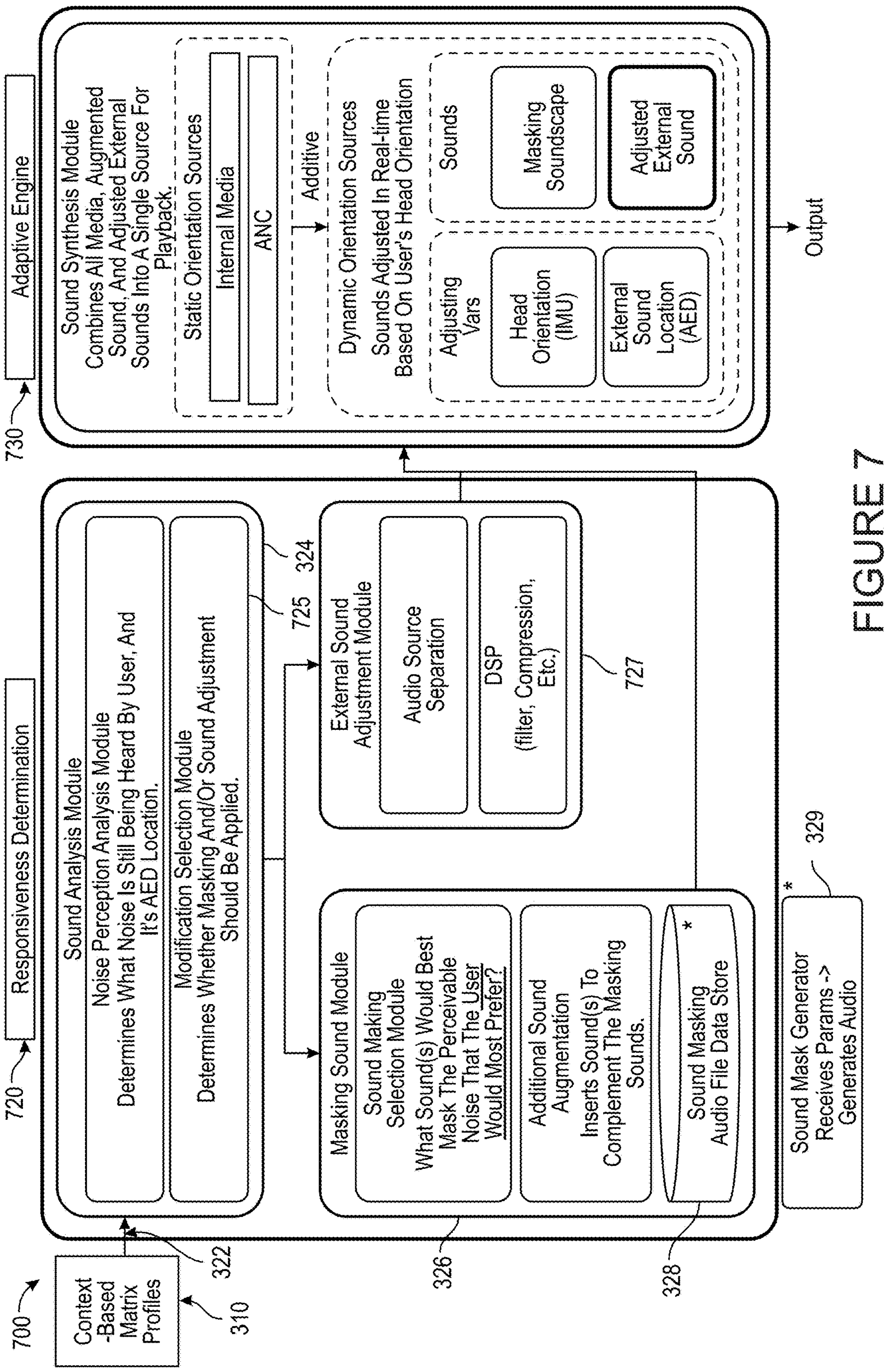
FIG. 7 illustrates an alternative example synthetic noise cancelling system workflow in accordance with this disclosure.

FIG. 7 illustrates an alternative example synthetic noise cancelling system workflow 700 in accordance with this disclosure. For ease of explanation, the workflow 700 shown in FIG. 7 is described as being implemented on or supported by the electronic devices 101 and 102 in the network configuration 100 of FIG. 1. The workflow 700 shown in FIG. 7 is a modification of the synthetic noise cancelling system workflow 300 of FIG. 3. For the sake of simplicity, elements of the workflow 300 that are unchanged in workflow 700 will not be described again.

As shown in FIG. 7, the workflow 700 includes a responsiveness determination workflow 720, which is a modification of the responsiveness determination workflow 320 to support adjusting (or modifying) external noise sounds as an alternative to (or in addition to) masking them. Specifically, the responsiveness determination workflow 720 includes a modification selection module 725 and an external sound adjustment module 727. Once the sound analysis module 324 has determined the parameters of undesirable external noise that can be perceived by the user, the modification selection module 725 determines whether sound masking or sound adjustment is the most appropriate way to render the undesirable noise imperceptible to the user. If the modification selection module 725 determines that sound adjustment is appropriate, then the external sound adjustment module 727 may apply, e.g., digital signal processing (DSP) to each external sound object (i.e., each audio source) separately, resulting in adjusted external sounds.

The workflow 700 also includes an adaptive engine workflow 730 that is a modification of the adaptive engine workflow 330 to support synthesis of a final dynamic masking soundscape that includes adjusted external sounds generated by the responsiveness determination workflow 720, as shown in FIG. 7.

Although FIG. 7 illustrates one example of a synthetic noise cancelling system workflow 700, various changes may be made to FIG. 7. For example, various components and functions in FIG. 7 may be combined, further subdivided, replicated, or rearranged according to particular needs. Also, one or more additional components and functions may be included if needed or desired.

Figure 8A:
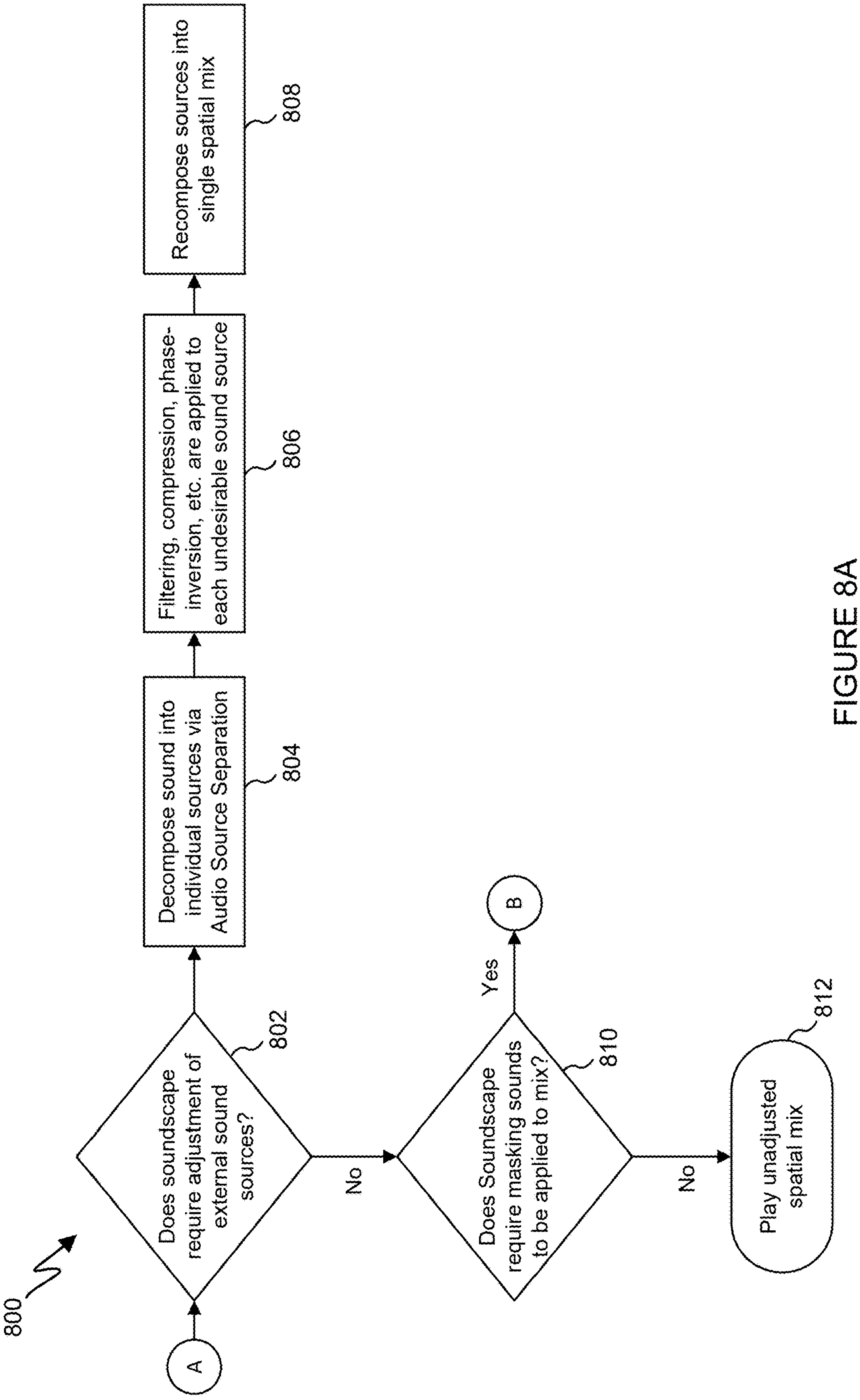
FIGS. 8A and 8B illustrate an example synthetic noise cancelling process in accordance with this disclosure.
Figure 8B:
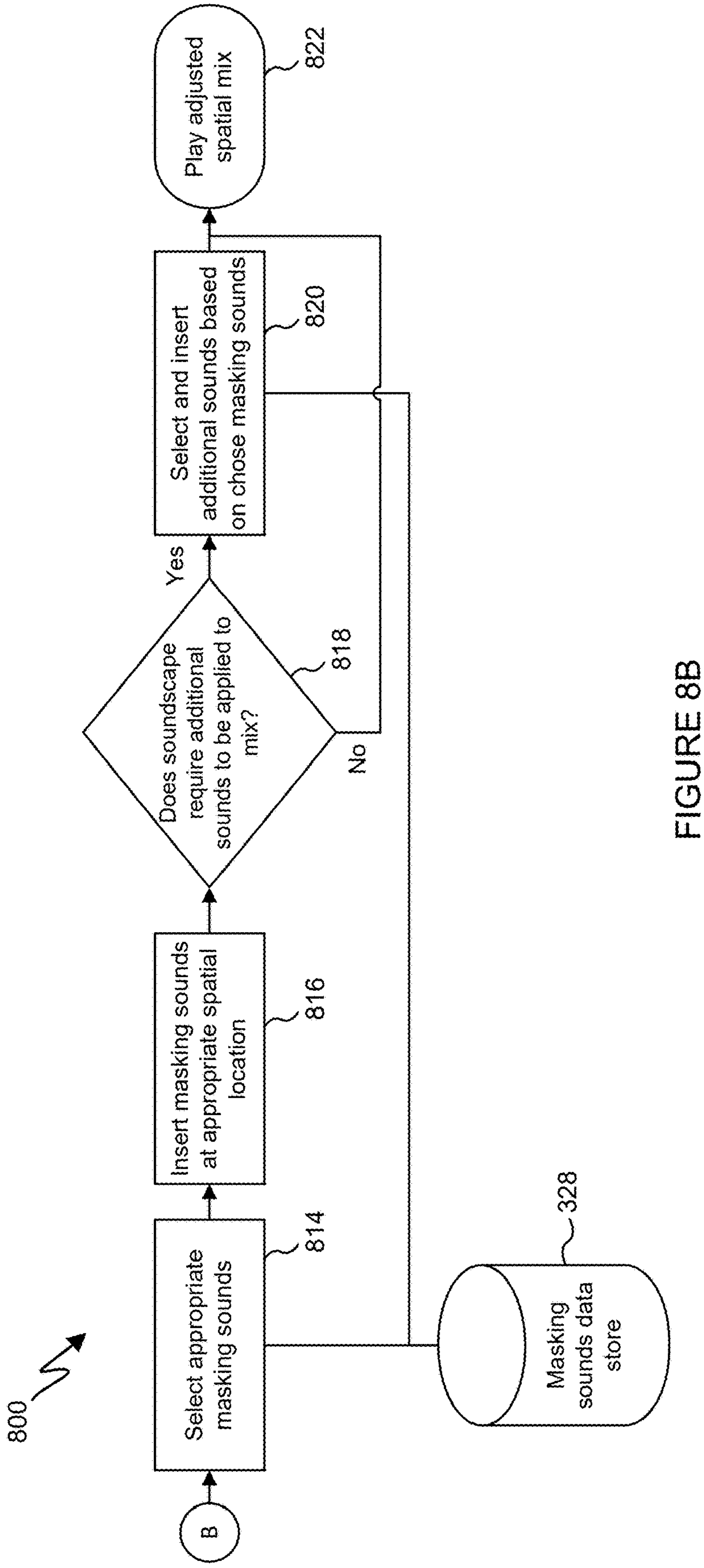

FIGS. 8A and 8B illustrate an example synthetic noise cancelling process 800 in accordance with this disclosure. For ease of explanation, the process 800 shown in FIGS. 8A and 8B is described as being implemented on or supported by the electronic devices 101 and 102 in the network configuration 100 of FIG. 1. The process 800 shown in FIGS. 8A and 8B is an example of a process that may be performed by the synthetic noise cancelling system workflow 700 of FIG. 7. The process 800 shown in FIGS. 8A and 8B is a modification of the synthetic noise cancelling process 600 of FIG. 6. For the sake of simplicity, elements of process 600 that are unchanged in process 800 will not be described again.

As shown in FIG. 8A, process 800 begins at marker A of process 600—that is, after the process determines at step 608 that the user can still perceive some undesirable external noise. At step 802 the process 800 determines whether to adjust external sound sources (e.g., sound objects of the undesirable external noise). The modification selection module 725 may perform step 802. If the process determines to adjust external sound sources, then at step 804 the process decomposes the external noise into individual undesirable sound sources and at step 806 performs DSP operations such as filtering, compression, phase inversion, or the like on each individual undesirable sound source. Steps 804 and 806 may be performed using, e.g., the external sound adjustment module 727. At step 808, the process recomposes the adjusted individual undesirable sound sources into a single (spatial) mix. This may be done by, e.g., the adaptive engine workflow 730.

After the spatial mix has been recomposed with adjusted external sound sources at step 808—or after the process determines at step 802 not to adjust the external sound sources—the process proceeds to step 810. At step 810 the process determines whether to apply masking sounds to the spatial mix (that is, whether to select or generate masking sounds). In this example, since the process has determined (at step 608) that there is some undesirable external noise perceived by the user, then the answer at one or both of steps 802 and 810 will be "Yes" (that is, at least one of sound masking or sound adjustment will be performed). If the process determines not to apply sound masking at step 810, then the process ends by playing the spatial mix at step 812.

Referring to FIG. 8B, if the process does determine to apply sound masking at step 810, then at step 814 the process determines an appropriate masking sound (or sounds). Step 814 may be the same as step 610 of process 600, and may be performed by the masking sound module 326 of responsiveness determination workflow 720. Then, at step 816, the process inserts the masking sounds at the appropriate spatial location in the spatial mix. Step 816 may be similar to step 612 of process 600, and may be performed by the adaptive engine workflow 730.

At step 818, the process determines whether additional masking sounds still need to be added to the spatial mix. This may be done by the masking sound module 326 of the responsiveness determination workflow 720. If so, then at step 820 the process determines the additional sounds (similar to step 814) and inserts them into the mix (similar to step 816). The process ends by playing the adjusted spatial mix at step 822.

An appropriate masking sound (or sounds) to mask the undesirable noise that the user can still perceive. In this example, the masking sounds are selected from a database 328. In other embodiments, a sound mask generator 329 may be used to generate the masking sounds. and a spatial location at which to play them. Step 608 may be performed by the responsiveness determination workflow 320.

Although FIGS. 8A and 8B illustrate one example of a synthetic noise cancelling process 800, various changes may be made to FIGS. 8A and 8B. For example, while shown as a series of steps, various steps in FIGS. 8A and 8B could overlap, occur in parallel, occur in a different order, or occur any number of times (including zero times). As a particular example, steps 818-820 may be omitted, or a sound mask generator 329 may be added or used in place of database 328 to generate masking sounds.

Figure 9:
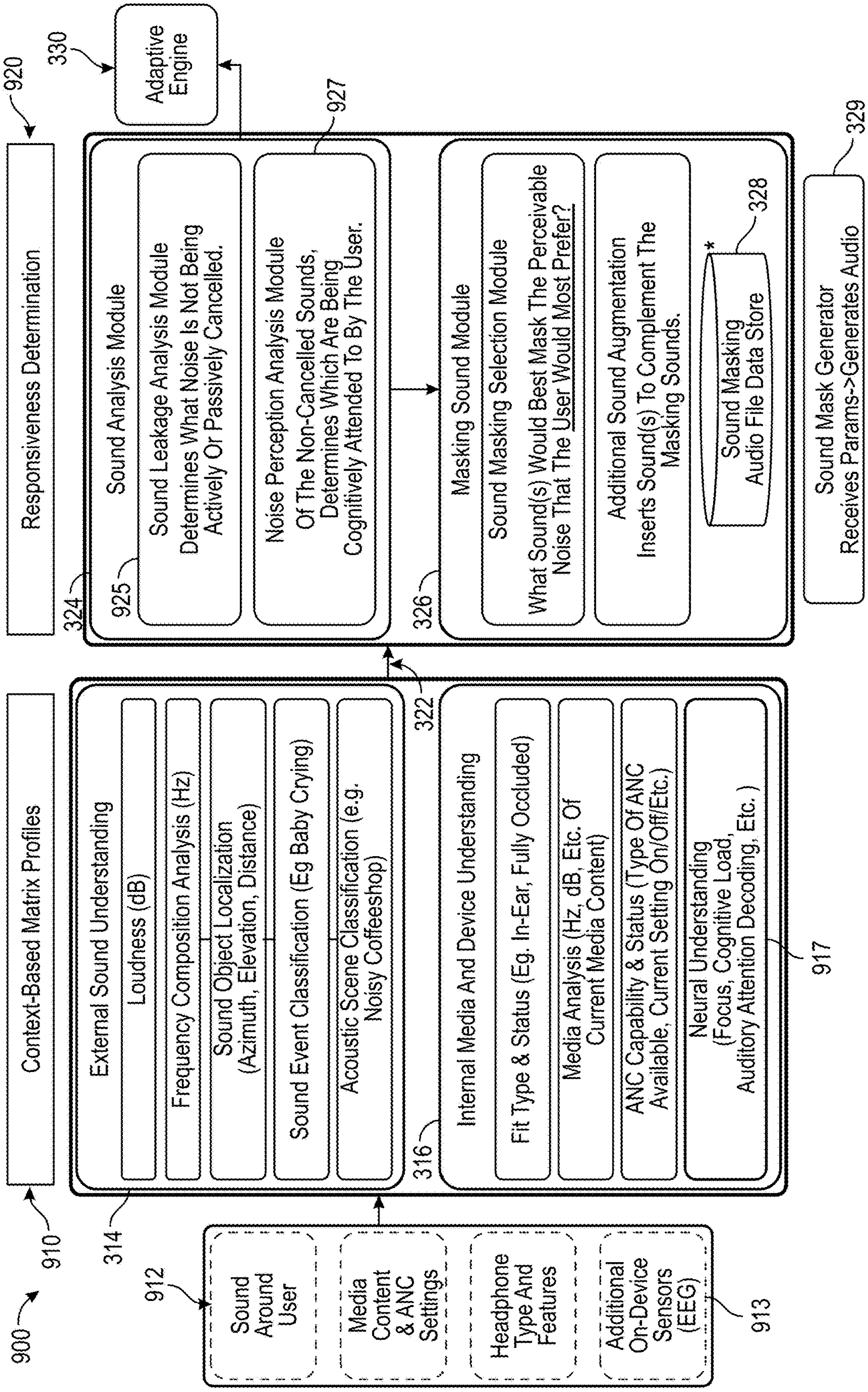
FIG. 9 illustrates another alternative example synthetic noise cancelling system workflow in accordance with this disclosure.

FIG. 9 illustrates another alternative example synthetic noise cancelling system workflow 900 in accordance with this disclosure. For ease of explanation, the workflow 900 shown in FIG. 9 is described as being implemented on or supported by the electronic devices 101 and 102 in the network configuration 100 of FIG. 1. The workflow 900 shown in FIG. 9 is a modification of the synthetic noise cancelling system workflow 300 of FIG. 3. For the sake of simplicity, elements of the workflow 300 that are unchanged in workflow 900 will not be described again.

As shown in FIG. 9, the workflow 900 includes a context-based matrix profile workflow 910, which is a modification of the context-based matrix profile workflow 310 to support an augmented user understanding. The context-based matrix profile workflow 910 takes inputs 912, which include the inputs 312 as well as additional on-device sensor data 913. In this example, the audio playback device is a head-worn audio device that has integrated electroencephalogram (EEG) sensors, which enable the system to gain a more advanced understanding of how the user is perceiving noise. The additional on-device sensor data 913 is, accordingly, EEG data. In various other embodiments, other psychophysiological data measurements may be obtained as one of inputs 912.

The internal media and device understanding component 316 of the context-based matrix profile workflow 910 is modified to include a neural understanding component 917 that analyzes the additional on-device sensor data 913 (e.g., the EEG data) to gain a more advanced understanding of how the user is perceiving external noise. For example, the neural understanding component 917 may derive second order information from EEG data, such as auditory attention decoding (e.g., an explicit understanding of which sounds the user is cognitively attending to), cognitive load (as a correlative variable to distracting noise), and focus level of the user (e.g., the user's overall level of focus, as a correlative variable to distracting sound). The results of this analysis may be added to the inputs 322.

The workflow 900 also includes a responsiveness determination workflow 920, which is a modification of the responsiveness determination workflow 320 to take advantage of the additional parameters related to neural understanding that are provided with the inputs 322 by the neural understanding component 917. Specifically, the responsiveness determination workflow 920 includes a sound leakage analysis module 925 that determines the remaining external noise sound components that are not being actively or passively canceled (and thus may be perceived by the user), and includes a noise perception analysis module 927, which is modified to use the additional parameters related to neural understanding in order to determine whether and how the remaining external noise sound components are bothering the user. For example, the noise perception analysis module 927 may determine which of the external noise sound components are being cognitively attended to by the user, and how those components are affecting the user's cognitive load and focus level (which are correlated with how distracting the noise is).

The responsiveness determination workflow 920 can then use the masking sound module 326 to select or generate an appropriate masking soundscape, taking advantage of the analysis results of the noise perception analysis module 927. For example, the masking sound module 326 may select or generate masking sounds only for remaining external noise sound components that are determined by the noise perception analysis module 927 to be distracting to the user.

Although FIG. 9 illustrates one example of a synthetic noise cancelling system workflow 900, various changes may be made to FIG. 9. For example, various components and functions in FIG. 9 may be combined, further subdivided, replicated, or rearranged according to particular needs. Also, one or more additional components and functions may be included if needed or desired. As a particular example, FIG. 9 could be modified to include features of FIG. 7 related to external sound adjustment.

Figure 10:
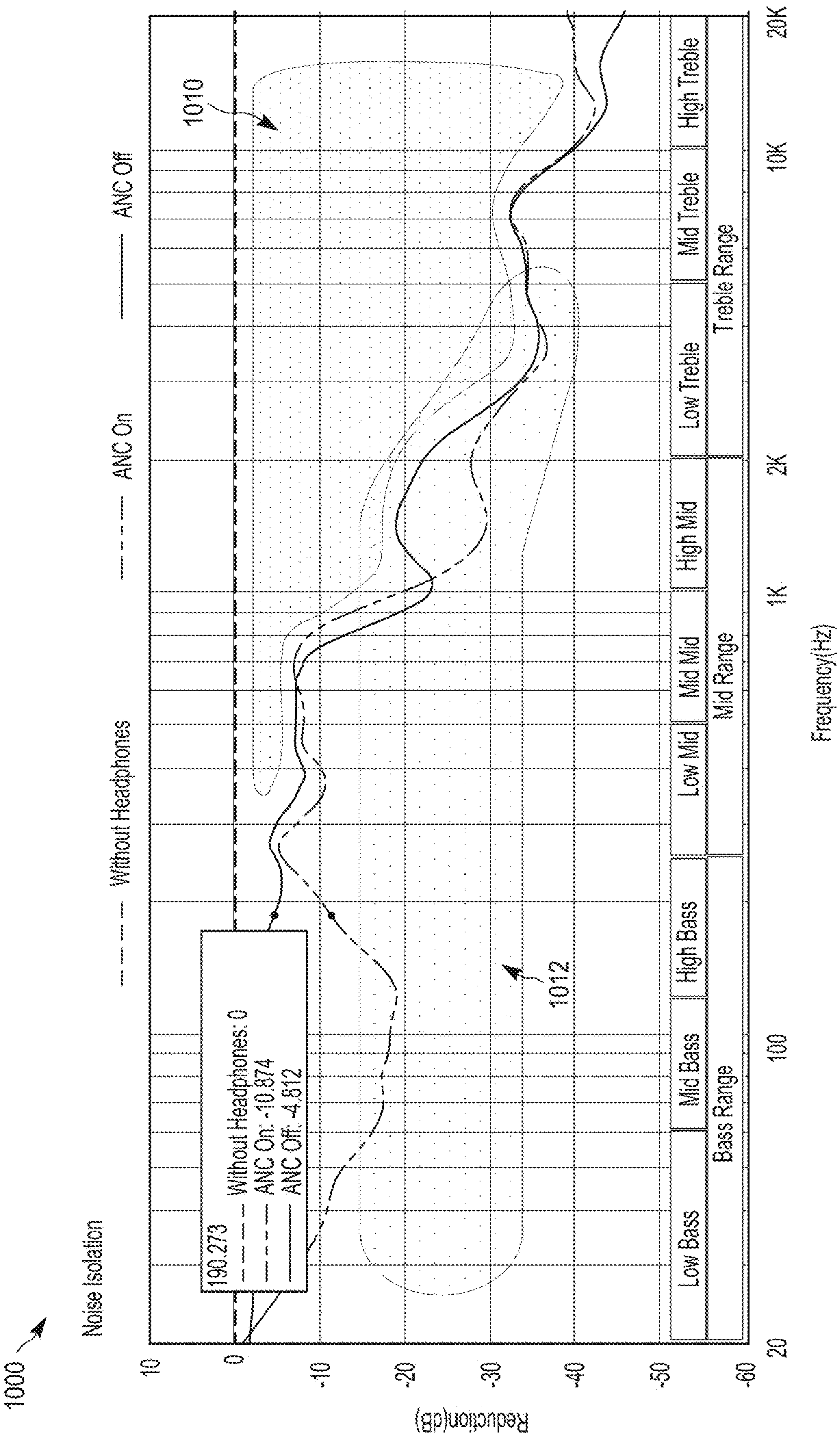
FIG. 10 illustrates an example graph of sound isolation showing opportunity areas for sound masking and sound enhancement in accordance with this disclosure.

FIG. 10 illustrates an example graph 1000 of sound isolation showing opportunity areas for sound masking and sound enhancement in accordance with this disclosure. In particular, FIG. 10 illustrates the amount of sound isolation (in terms of dB reduction) provided by headphones with ANC turned off, i.e., through passive isolation (line 1002), and with ANC turned on (line 1004).

FIG. 10 further illustrates that there are opportunity areas for sound masking (area 1010) and for sound enhancement (area 1012). In the area 1010, spatial sound masking as discussed herein above compensates well for the limitations of the ANC. Meanwhile, in the sound enhancement area 1012, an artificial soundscape that is designed based on the external soundscape to simulate a version of the external environment may lessen the discomfort from ANC with less distraction than sound masking. This may be done, for example, in the synthetic noise cancelling system workflow 300 as part of the masking sound module 326 (e.g., in the additional sound augmentation component).

Figure 11:
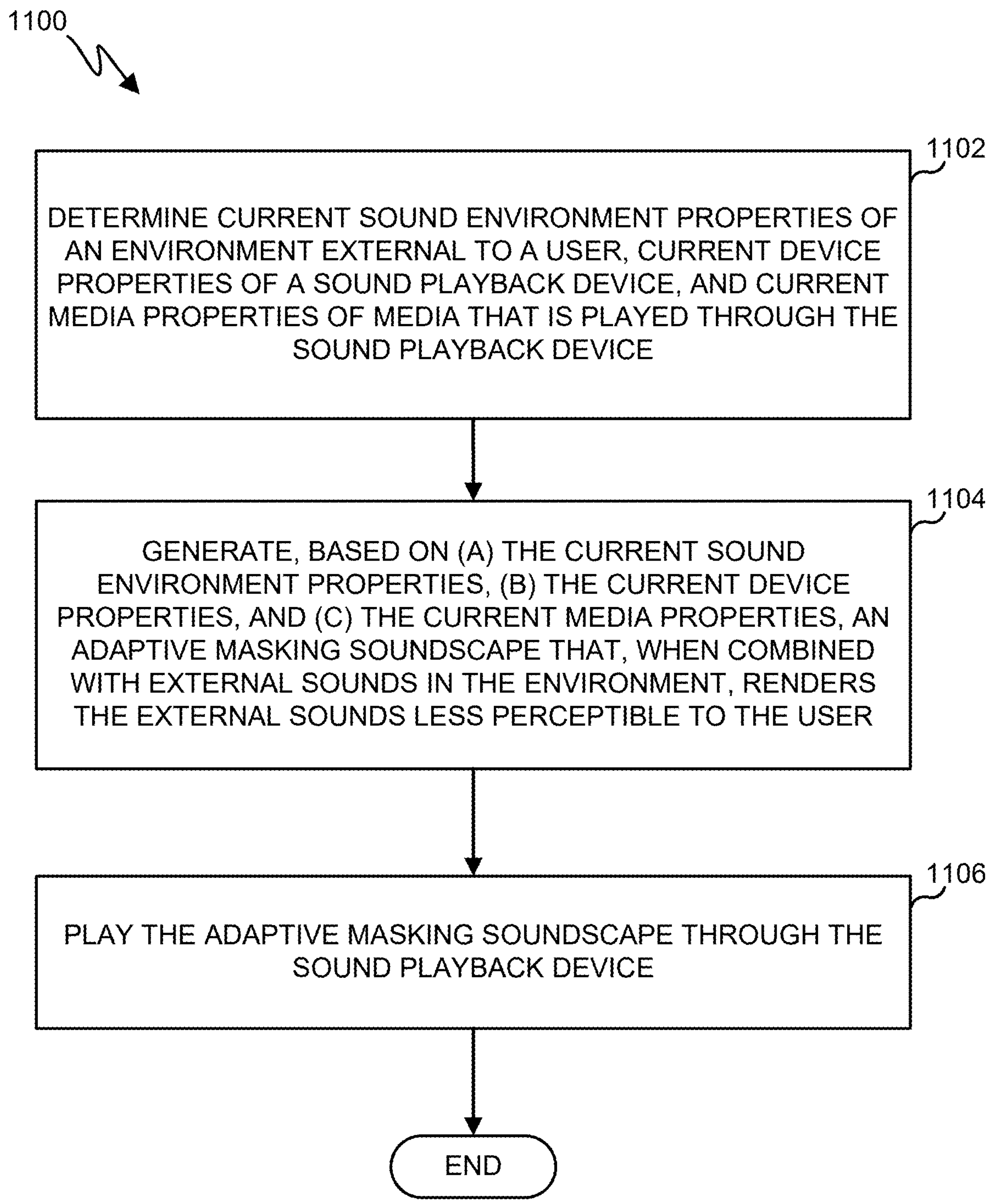
FIG. 11 illustrates an example method for dynamic and adaptive-degree sound generation based upon real-time understanding of environment and user context for noise masking, noise alteration, or virtual soundscape generation in accordance with this disclosure.

FIG. 11 illustrates an example method 1100 for dynamic and adaptive sound generation based upon real-time understanding of environment and user context for noise masking, noise alteration, or virtual soundscape generation in accordance with this disclosure. For ease of explanation, the method 1100 shown in FIG. 11 is described as being performed using a processor 120 the electronic device 101 in the network configuration 100 of FIG. 1. However, the method 1100 could be performed using any other suitable device(s), such as the electronic device 102 or a combination of electronic devices 101 and 102, and in any other suitable system(s).

At block 1102, the processor 120 determines current sound environment properties of an environment external to a user, current device properties of a sound playback device, and current media properties of media that is played through the sound playback device. The sound playback device may include, for example, earphones, headphones, an HMD, speakers, or the like. In some embodiments the sound playback device may be integrated with the electronic device. In some embodiments, the current sound environment properties may include locations of sound sources in the environment. In such embodiments, the processor 120 further determines a current spatial orientation of the user at block 1102.

In some embodiments, determining the current sound environment properties comprises determining at least one of a current frequency composition of the environment, a current loudness of the environment, a classification for each sound in the environment, and a classification of an acoustic scene of the environment. In some embodiments, determining the current device properties comprises determining at least one of a current ANC status of the sound playback device and an amount of ear canal occlusion caused by the sound playback device. In some embodiments, determining the current media properties comprises determining at least one of a current loudness of the media and a current frequency composition of the media.

At block 1104, the processor 120 generates, based on (a) the current sound environment properties, (b) the current device properties, and (c) the current media properties, an adaptive masking soundscape that, when combined with external sounds in the environment, renders the external sounds less perceptible to the user. In embodiments in which the processor 120 has determined the current spatial orientation of the user at block 1102, at block 1104 the processor additionally adjusts spatial properties of the adaptive masking soundscape based on the locations of the sound sources and the current spatial orientation of the user to generate a dynamic spatial masking soundscape.

In some embodiments, prior to block 1104 the processor 120 additionally compares the current sound environment properties to the current device and media properties to determine properties of currently perceptible external sounds in the environment, in which case the processor 120, as part of generating the adaptive masking soundscape at block 1104, determines, based on the properties of the currently perceptible external sounds, at least one masking sound that has positive emotional valence and will render the currently perceptible external sounds less perceptible to the user.

In some such embodiments, as part of determining the at least one masking sound the processor 120 additionally categorizes each of the currently perceptible external sounds as one of intelligible human speech, transient noise, or non-transient noise and selects, for each categorized currently perceptible external sound, a masking sound from a predefined set of masking sounds for that category. The predefined set of masking sounds for intelligible human speech includes sounds that, when played alongside intelligible human speech, render the speech unintelligible without introducing distraction, and without creating discomfort or negative emotional valence. The predefined set of masking sounds for transient noise includes transient sounds with positive emotional valence that, when played at a randomized interval alongside transient noise with a similar loudness and in a similar frequency range, render the transient noise less perceptible. The predefined set of masking sounds for non-transient noise includes non-transient sounds with positive emotional valence that, when played alongside non-transient noise with a similar loudness and in a similar frequency range, reduce a level of the non-transient noise perceived by the user.

In other such embodiments, as part of determining the at least one masking sound the processor generates, in real time, the at least one masking sound using the properties of the currently perceptible external sounds. This may be done using a generative audio engine (e.g., a generative AI model).

In yet other such embodiments, as part of determining the at least one masking sound the processor 120 categorizes the currently perceptible external sounds as transient noise and selects a masking sound from a predefined set of masking sounds with positive emotional valence that, when played alongside transient noise with a similar loudness and in a similar frequency range, render the transient noise less perceptible.

At block 1106 the adaptive masking soundscape is played through the sound playback device. In embodiments in which currently perceptible external sounds are categorized as transient noise and the masking sound is selected to render the transient noise less perceptible, block 1106 includes playing the selected masking sound at a time immediately after the transient noise occurs (i.e., performing backwards temporal masking).

Although FIG. 11 illustrates one example of a method 1100 for dynamic and adaptive sound generation based upon real-time understanding of environment and user context for noise masking, noise alteration, or virtual soundscape generation, various changes may be made to FIG. 11. For example, while shown as a series of steps, various steps in FIG. 11 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

determining, by a processor of an electronic device, current sound environment properties of an environment external to a user, current device properties of a sound playback device, and current media properties of media that is played through the sound playback device;

generating, by the processor based on (a) the current sound environment properties, (b) the current device properties, and (c) the current media properties, an adaptive masking soundscape that, when combined with external sounds in the environment, renders the external sounds less perceptible to the user;

determining, as at least part of the current sound environment properties, a classification of an acoustic scene of the environment;

determining, as at least part of the current sound environment properties, a category for each of currently perceptible external sounds in the environment as one of intelligible human speech, unintelligible human speech, transient noise, or non-transient noise;

selecting, as at least part of the adaptive masking soundscape and for each currently perceptible external sound categorized as intelligible human speech, transient noise, or non-transient noise, a masking sound from a set of masking sounds for that category; and playing the adaptive masking soundscape and the media simultaneously through the sound playback device.

2. The method of claim 1, wherein the current sound environment properties include locations of sound sources in the environment, and the method further comprises:

determining, by the processor, a current spatial orientation of the user;

adjusting, by the processor, spatial properties of the adaptive masking soundscape based on the locations of the sound sources and the current spatial orientation of the user to generate a dynamic spatial masking soundscape; and playing the dynamic spatial masking soundscape through the sound playback device.

3. The method of claim 1, wherein:

determining the current sound environment properties comprises determining, by the processor, at least one of a current frequency composition of the environment and a current loudness of the environment, determining the current device properties comprises determining, by the processor, at least one of a current active noise cancelling (ANC) status of the sound playback device and an amount of ear canal occlusion caused by the sound playback device, and determining the current media properties comprises determining, by the processor, at least one of a current loudness of the media and a current frequency composition of the media.

4. The method of claim 1, further comprising:

comparing, by the processor, the current sound environment properties to the current device and media properties to determine properties of the currently perceptible external sounds in the environment, wherein the masking sound has positive emotional valence and will render the currently perceptible external sounds less perceptible to the user when played through the sound playback device.

5. The method of claim 4, wherein the set of masking sounds is a predefined set of masking sounds.

6. The method of claim 5, wherein:

the predefined set of masking sounds for intelligible human speech includes sounds that, when played alongside intelligible human speech, render the speech unintelligible without introducing distraction, and without creating discomfort or negative emotional valence, the predefined set of masking sounds for transient noise includes transient sounds with positive emotional valence that, when played at a randomized interval alongside transient noise with a similar loudness and in a similar frequency range, render the transient noise less perceptible, and the predefined set of masking sounds for non-transient noise includes non-transient sounds with positive emotional valence that, when played alongside non-transient noise with a similar loudness and in a similar frequency range, reduce a level of the non-transient noise perceived by the user.

7. The method of claim 4, wherein the masking sound is generated in real time using the properties of the currently perceptible external sounds.

8. The method of claim 4, wherein:

determining the masking sound comprises:

categorizing, by the processor, the currently perceptible external sounds as transient noise; and selecting, by the processor, a masking sound from the set of masking sounds with positive emotional valence that, when played alongside transient noise with a similar loudness and in a similar frequency range, render the transient noise less perceptible, and playing the adaptive masking soundscape comprises playing, through the sound playback device, the selected masking sound at a time immediately after the transient noise occurs.

9. An electronic device comprising:

a processor configured to:

determine current sound environment properties of an environment external to a user, current device properties of a sound playback device, and current media properties of media that is played through the sound playback device, generate, based on (a) the current sound environment properties, (b) the current device properties, and (c) the current media properties, an adaptive masking soundscape that, when combined with external sounds in the environment, renders the external sounds less perceptible to the user, determine, as at least part of the current sound environment properties, a classification of an acoustic scene of the environment, determine, as at least part of the current sound environment properties, a category for each of currently perceptible external sounds in the environment as one of intelligible human speech, unintelligible human speech, transient noise, or non-transient noise, and select, as at least part of the adaptive masking soundscape and for each currently perceptible external sound categorized as intelligible human speech, transient noise, or non-transient noise, a masking sound from a set of masking sounds for that category, wherein the adaptive masking soundscape and the media is played simultaneously through the sound playback device.

10. The electronic device of claim 9, wherein:

the current sound environment properties include locations of sound sources in the environment, the processor is further configured to:

determine a current spatial orientation of the user; and adjust spatial properties of the adaptive masking soundscape based on the locations of the sound sources and the current spatial orientation of the user to generate a dynamic spatial masking soundscape, and the dynamic spatial masking soundscape is played through the sound playback device.

11. The electronic device of claim 9, wherein the processor is configured to:

determine, as at least part of the current sound environment properties, at least one of a current frequency composition of the environment and a current loudness of the environment;

determine, as at least part of the current device properties, at least one of a current active noise cancelling (ANC) status of the sound playback device and an amount of ear canal occlusion caused by the sound playback device; and determine, as at least part of the current media properties, at least one of a current loudness of the media and a current frequency composition of the media.

12. The electronic device of claim 9, wherein the processor is configured to:

compare the current sound environment properties to the current device and media properties to determine properties of the currently perceptible external sounds in the environment; and wherein the masking sound has positive emotional valence and will render the currently perceptible external sounds less perceptible to the user when played through the sound playback device.

13. The electronic device of claim 12, wherein the set of masking sounds is a predefined set of masking sounds.

14. The electronic device of claim 13, wherein:

the predefined set of masking sounds for intelligible human speech includes sounds that, when played alongside intelligible human speech, render the speech unintelligible without introducing distraction, and without creating discomfort or negative emotional valence, the predefined set of masking sounds for transient noise includes transient sounds with positive emotional valence that, when played at a randomized interval alongside transient noise with a similar loudness and in a similar frequency range, render the transient noise less perceptible, and the predefined set of masking sounds for non-transient noise includes non-transient sounds with positive emotional valence that, when played alongside non-transient noise with a similar loudness and in a similar frequency range, reduce a level of the non-transient noise perceived by the user.

15. The electronic device of claim 12, wherein the masking sound is generated in real time using the properties of the currently perceptible external sounds.

16. The electronic device of claim 12, wherein:

the processor configured to determine the masking sound is configured to:

categorize the currently perceptible external sounds as transient noise; and select a masking sound from the set of masking sounds with positive emotional valence that, when played alongside transient noise with a similar loudness and in a similar frequency range, render the transient noise less perceptible, and the selected masking sound is played through the sound playback device at a time immediately after the transient noise occurs.

17. A non-transitory computer readable medium containing instructions that when executed cause at least one processor of an electronic device to:

determine current sound environment properties of an environment external to a user, current device properties of a sound playback device, and current media properties of media that is played through the sound playback device;

generate, based on (a) the current sound environment properties, (b) the current device properties, and (c) the current media properties, an adaptive masking soundscape that, when combined with external sounds in the environment, renders the external sounds less perceptible to the user;

determine, as at least part of the current sound environment properties, a classification of an acoustic scene of the environment;

determine, as at least part of the current sound environment properties, a category for each of currently perceptible external sounds in the environment as one of intelligible human speech, unintelligible human speech, transient noise, or non-transient noise; and select, as at least part of the adaptive masking soundscape and for each currently perceptible external sound categorized as intelligible human speech, transient noise, or non-transient noise, a masking sound from a set of masking sounds for that category, wherein the adaptive masking soundscape and the media is played simultaneously through the sound playback device.

18. The non-transitory computer readable medium of claim 17, wherein:

the current sound environment properties include locations of sound sources in the environment, the non-transitory computer readable medium further contains instructions that when executed cause the at least one processor to:

determine a current spatial orientation of the user; and adjust spatial properties of the adaptive masking soundscape based on the locations of the sound sources and the current spatial orientation of the user to generate a dynamic spatial masking soundscape, and the dynamic spatial masking soundscape is played through the sound playback device.

19. The non-transitory computer readable medium of claim 17, further containing instructions that when executed cause the at least one processor to:

determine, as at least part of the current sound environment properties, at least one of a current frequency composition of the environment and a current loudness of the environment;

determine, as at least part of the current device properties, at least one of a current active noise cancelling (ANC) status of the sound playback device and an amount of ear canal occlusion caused by the sound playback device; and determine, as at least part of the current media properties, at least one of a current loudness of the media and a current frequency composition of the media.

20. The non-transitory computer readable medium of claim 17, further containing instructions that when executed cause the at least one processor to:

compare the current sound environment properties to the current device and media properties to determine properties of the currently perceptible external sounds in the environment; and wherein the masking sound has positive emotional valence and will render the currently perceptible external sounds less perceptible to the user when played through the sound playback device.

* * * * *